United States Patent [19]

Dunn et al.

[11] 4,087,677

[45] May 2, 1978

[54] DIGITAL PSK MODEM

[75] Inventors: James Grant Dunn, Upper Montclair; Philip Duncan Carmichael, Closter, both of N.J.

[73] Assignee: International Telephone & Telegraph Corporation, Nutley, N.J.

[21] Appl. No.: 728,094

[22] Filed: Sep. 29, 1976

[51] Int. Cl.² ............................................. H02B 1/00
[52] U.S. Cl. ........................................ 325/30; 325/163; 325/320; 179/15 BM; 178/67
[58] Field of Search ............... 325/30, 163, 320, 42, 325/38 R, 38 B, 65; 178/53, 67; 179/15 BM, 15 R

[56] References Cited

U.S. PATENT DOCUMENTS

| | | | |
|---|---|---|---|
| 3,337,691 | 8/1967 | Litchman | 325/30 |
| 3,412,206 | 11/1968 | Bizet | 325/30 |
| 3,727,005 | 4/1973 | Franaszek | 179/15 BM |
| 3,983,485 | 9/1976 | Stuart | 325/163 |

OTHER PUBLICATIONS

Peterson et al., Error-Correcting Codes, Copyright 1972, pp. 412–421.

*Primary Examiner*—Robert L. Griffin
*Assistant Examiner*—Michael A. Masinick

*Attorney, Agent, or Firm*—John T. O'Halloran; Alfred C. Hill

[57] ABSTRACT

In the transmitter portion a multiplexer multiplexes first digital data and first teletype signals to provide first digital data signals. The first digital data signals are converted into second digital data signals having a different form than the first digital data signals by a Viterbi coder. A PSK modulator responsive to the second digital data signals provides a first PSK signal for transmission. In the receiver portion a PSK demodulator receives a second PSK signal containing third digital data signals having multiplexed second digital data and second teletype signals with the third digital data signals being extracted from the second PSK signal. A Viterbi decoder converts the third digital data signals into fourth digital data signlas having a different digital form than the third digital data signals. A PSK demultiplexer is responsive to the fourth digital data signals to separate the second digital data and the second teletype signals for utilization. The arrangement to extract the third digital data signals from the second PSK signals includes the PSK demodulator and a Costas' type phase locked loop including a number controlled oscillator, a digital phase shifter, an accumulator arrangement including three accumulators accumulating different data and errors, a clock recovery circuit and a loop filter controlling the number controlled oscillator.

44 Claims, 40 Drawing Figures

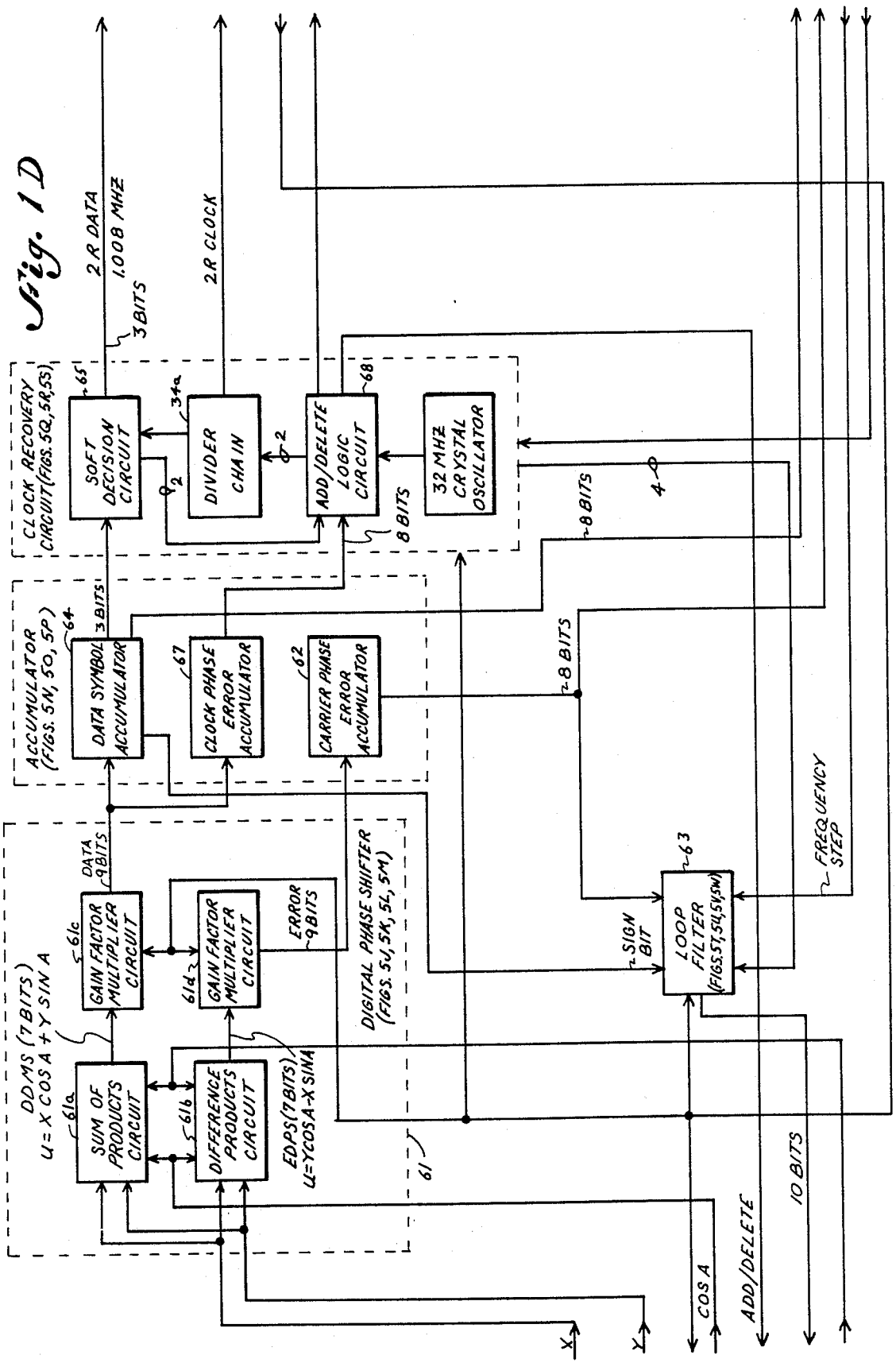

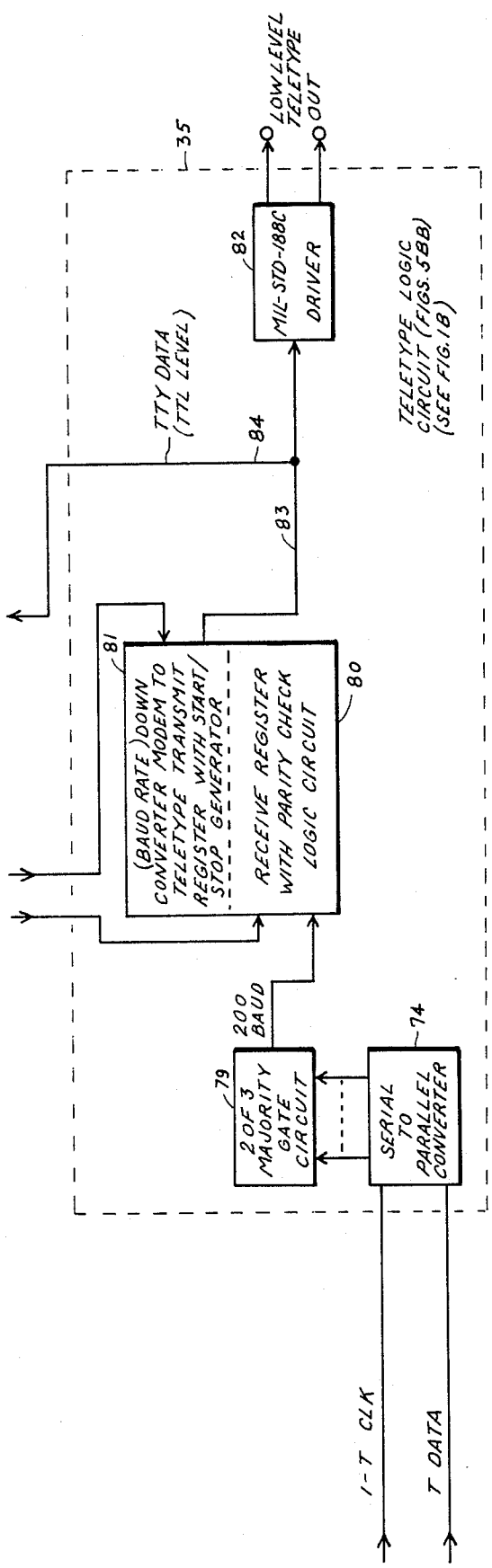

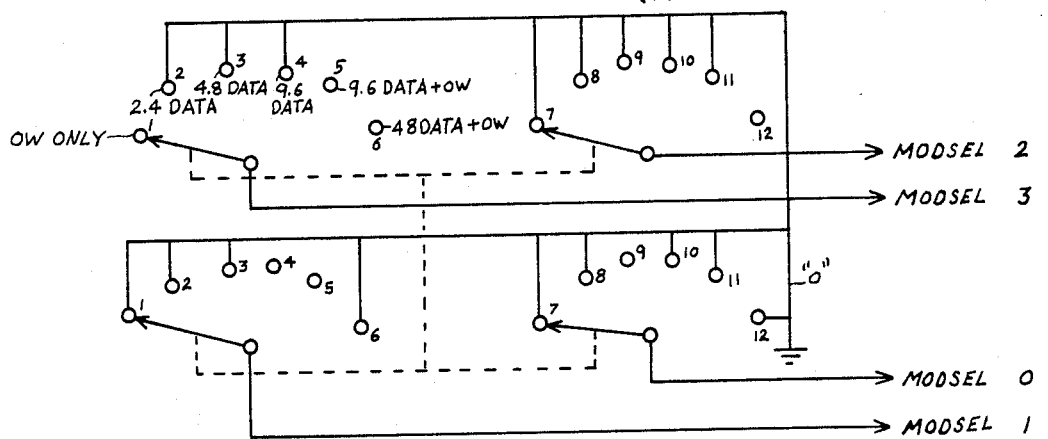
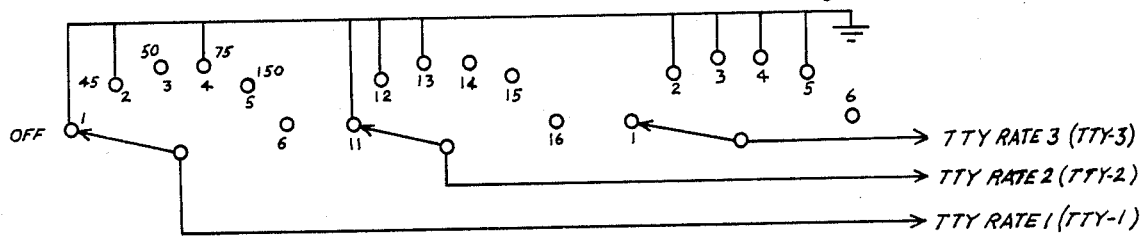
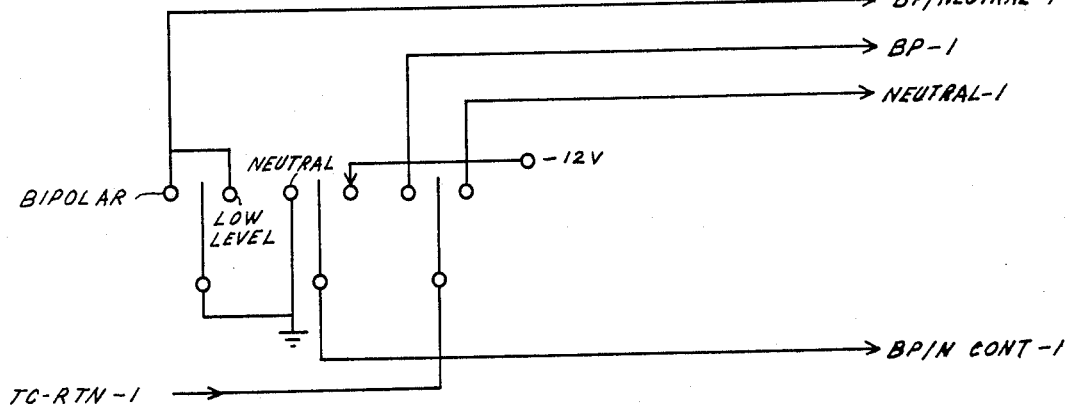

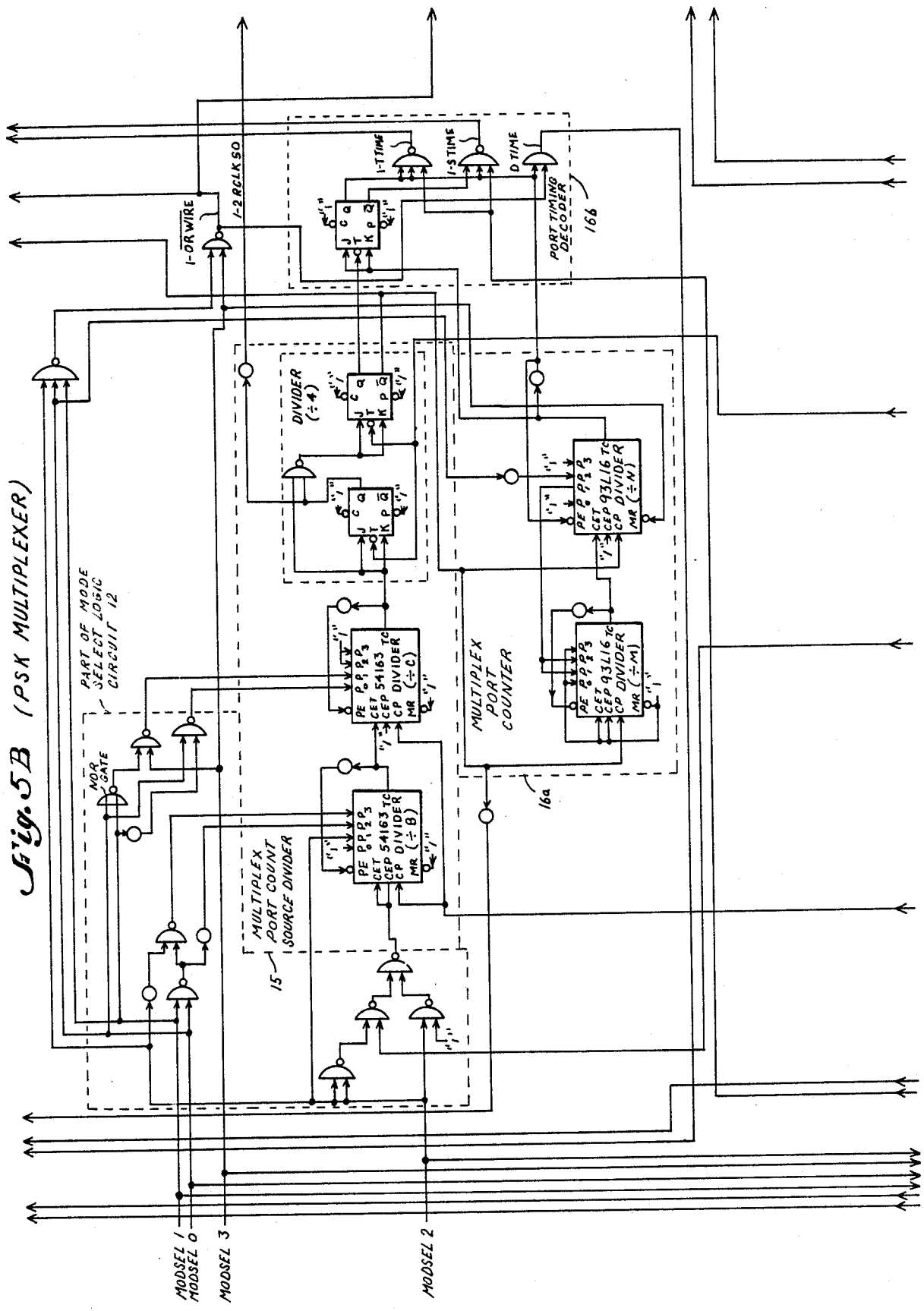

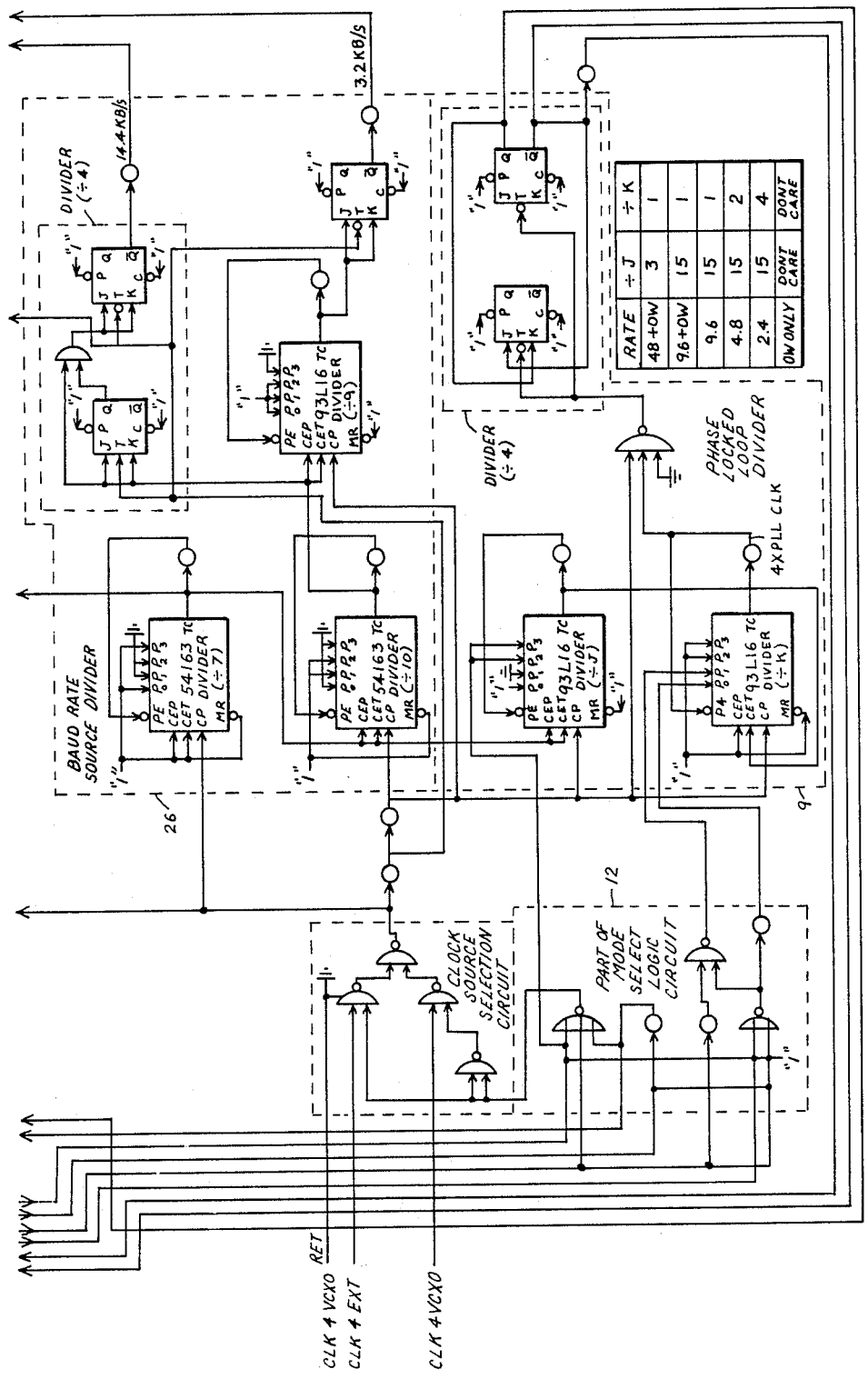
Fig. 5C (PSK MULTIPLEXER)

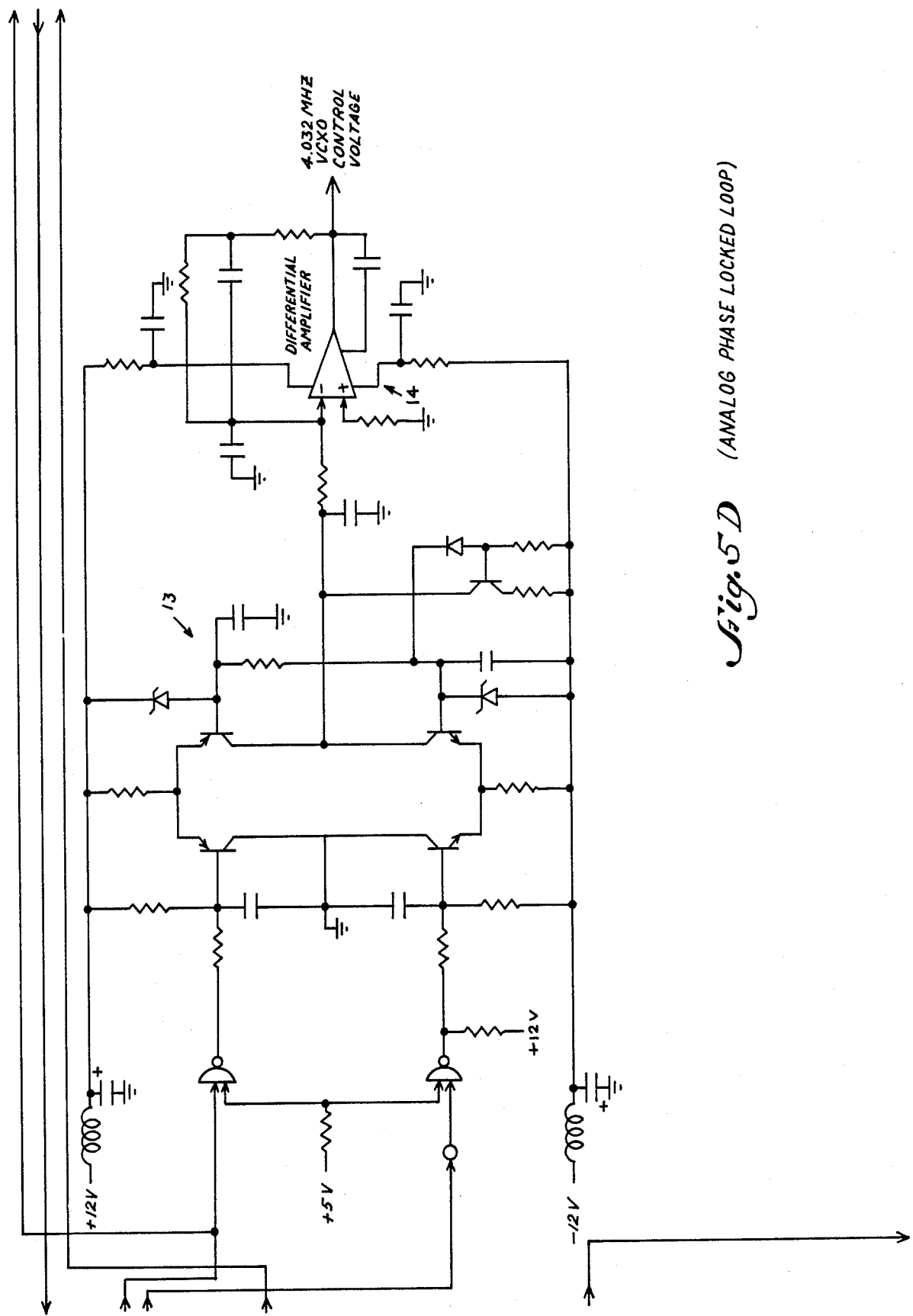
Fig. 5D (ANALOG PHASE LOCKED LOOP)

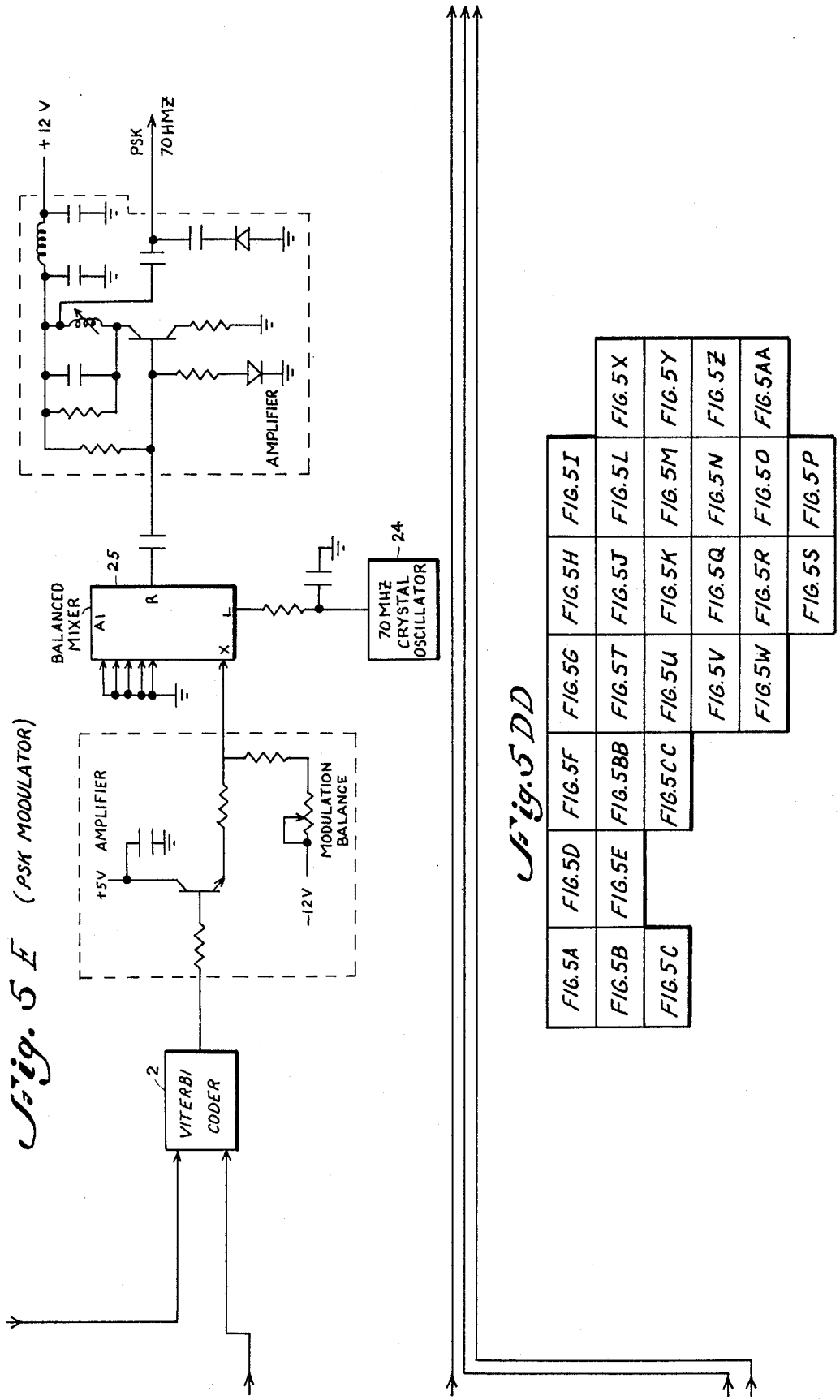

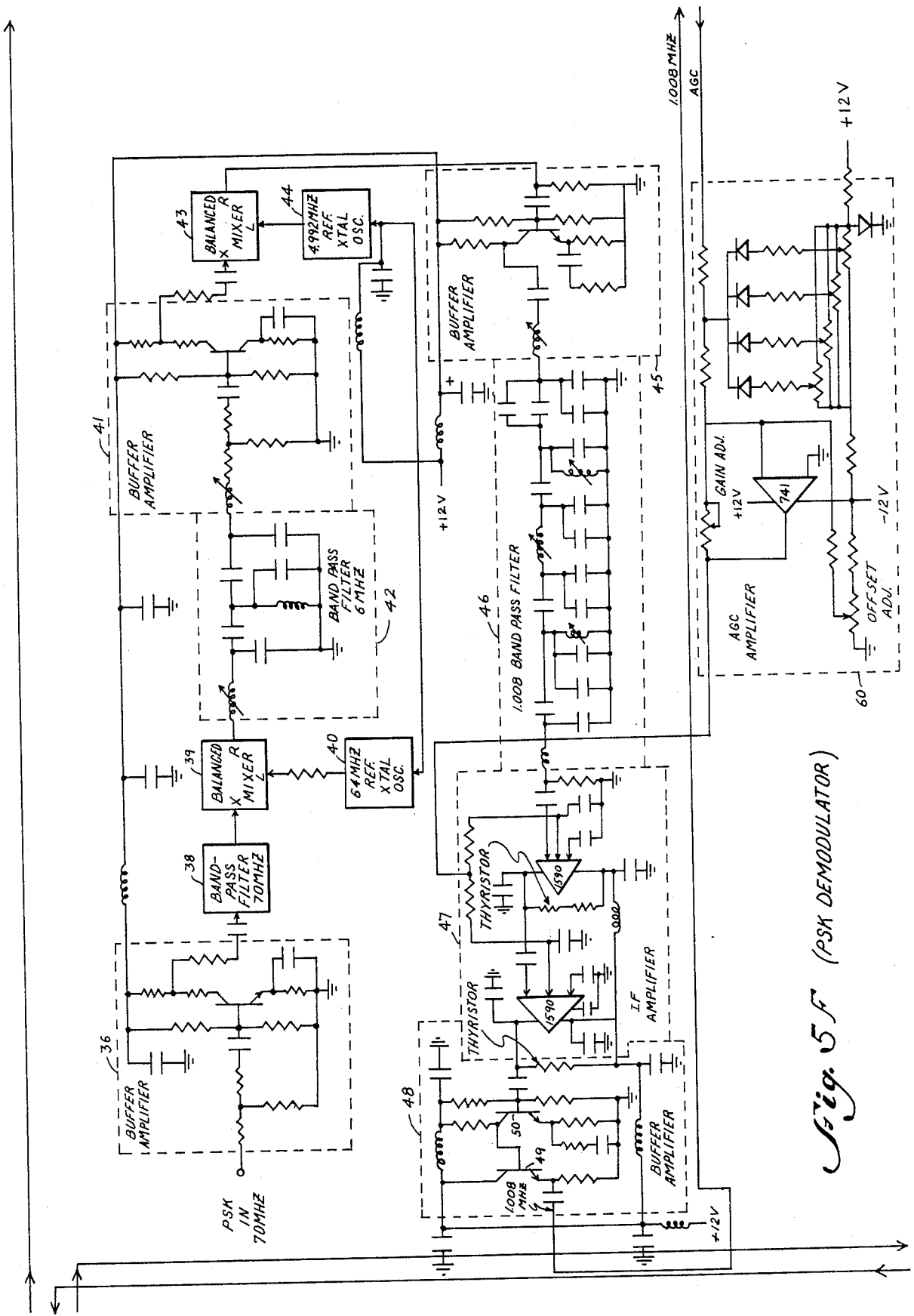
Fig. 5F (PSK DEMODULATOR)

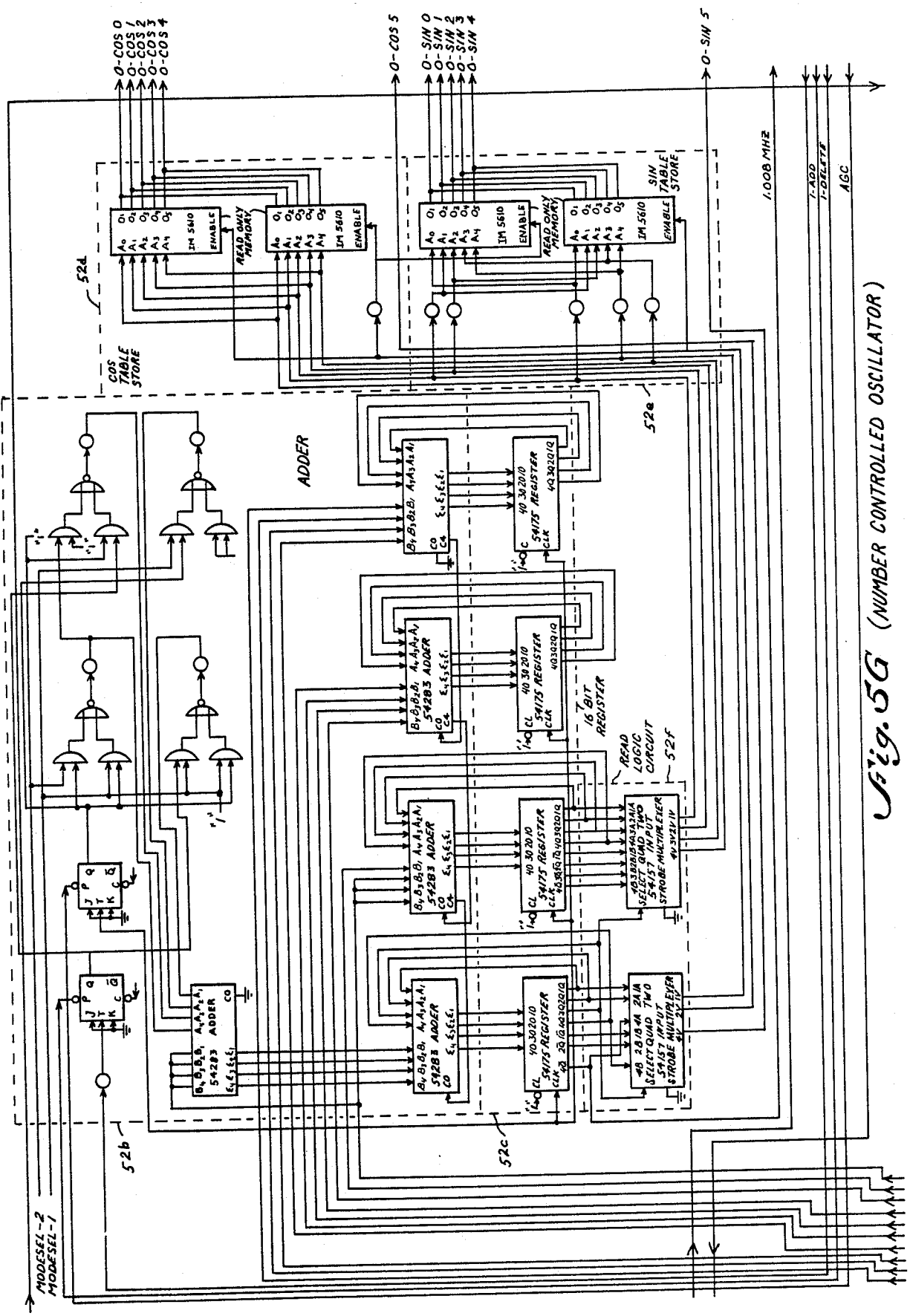
Fig. 5G (NUMBER CONTROLLED OSCILLATOR)

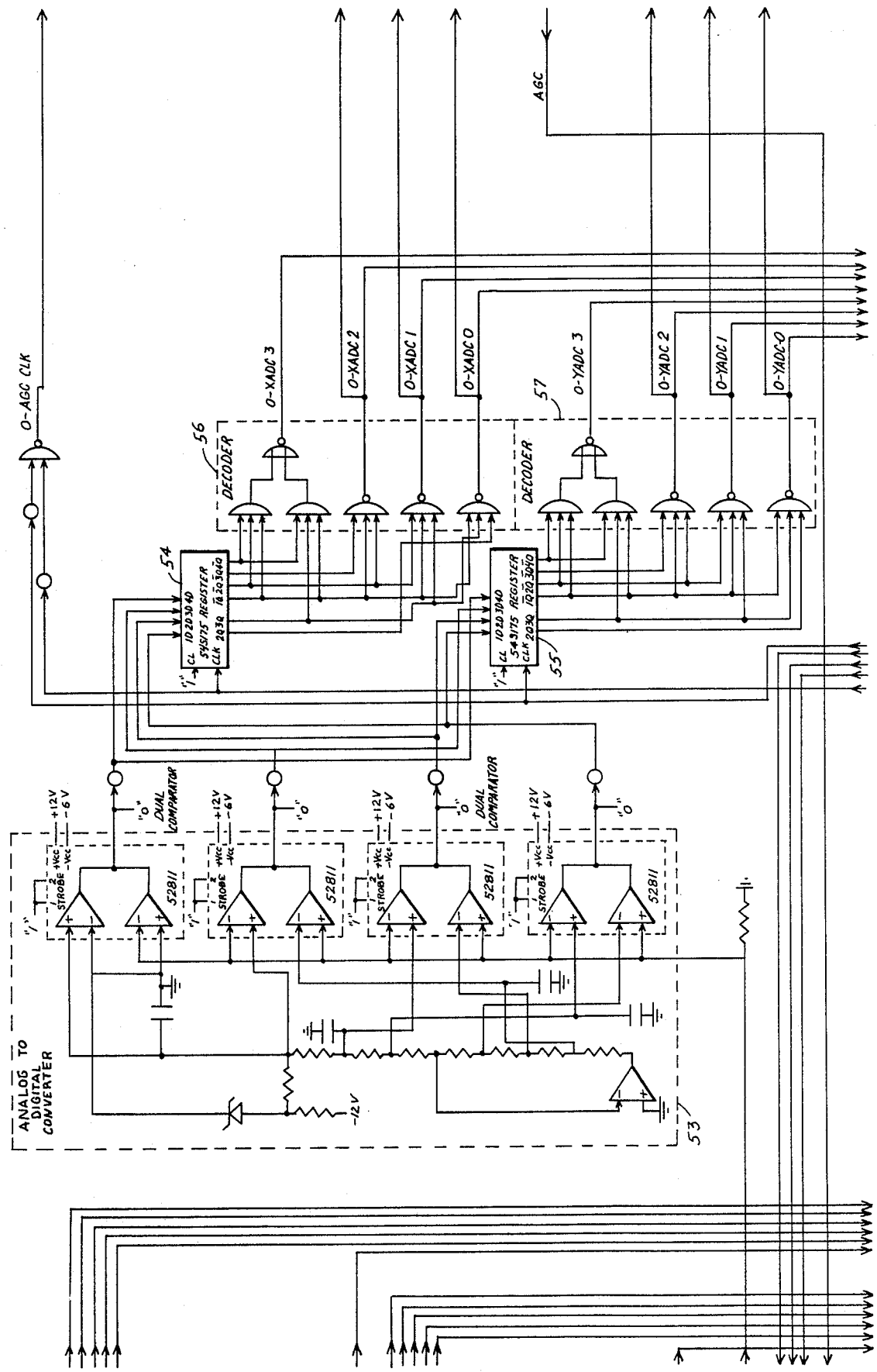
Fig. 5H (NUMBER CONTROLLED OSCILLATOR)

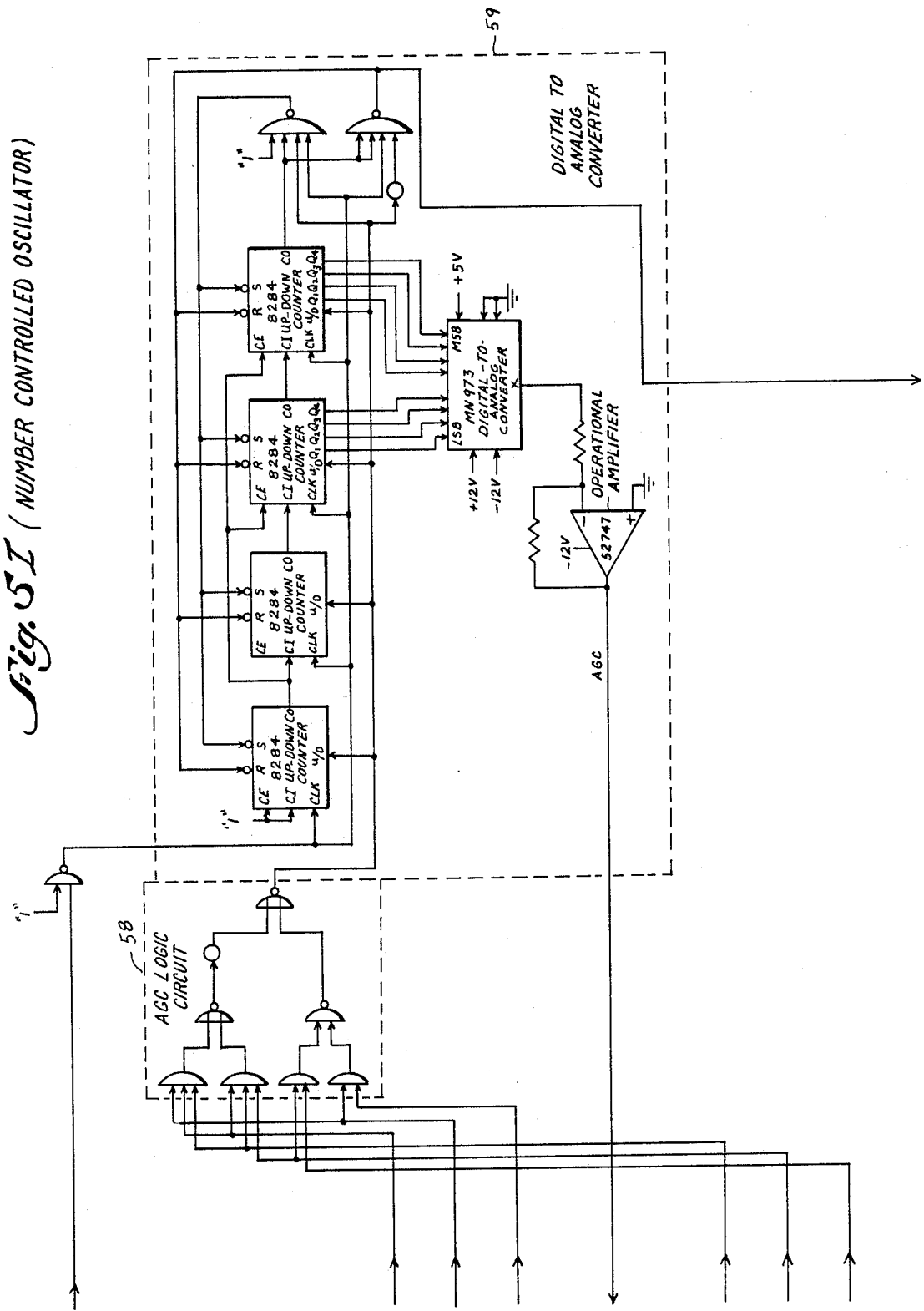
Fig. 5I (NUMBER CONTROLLED OSCILLATOR)

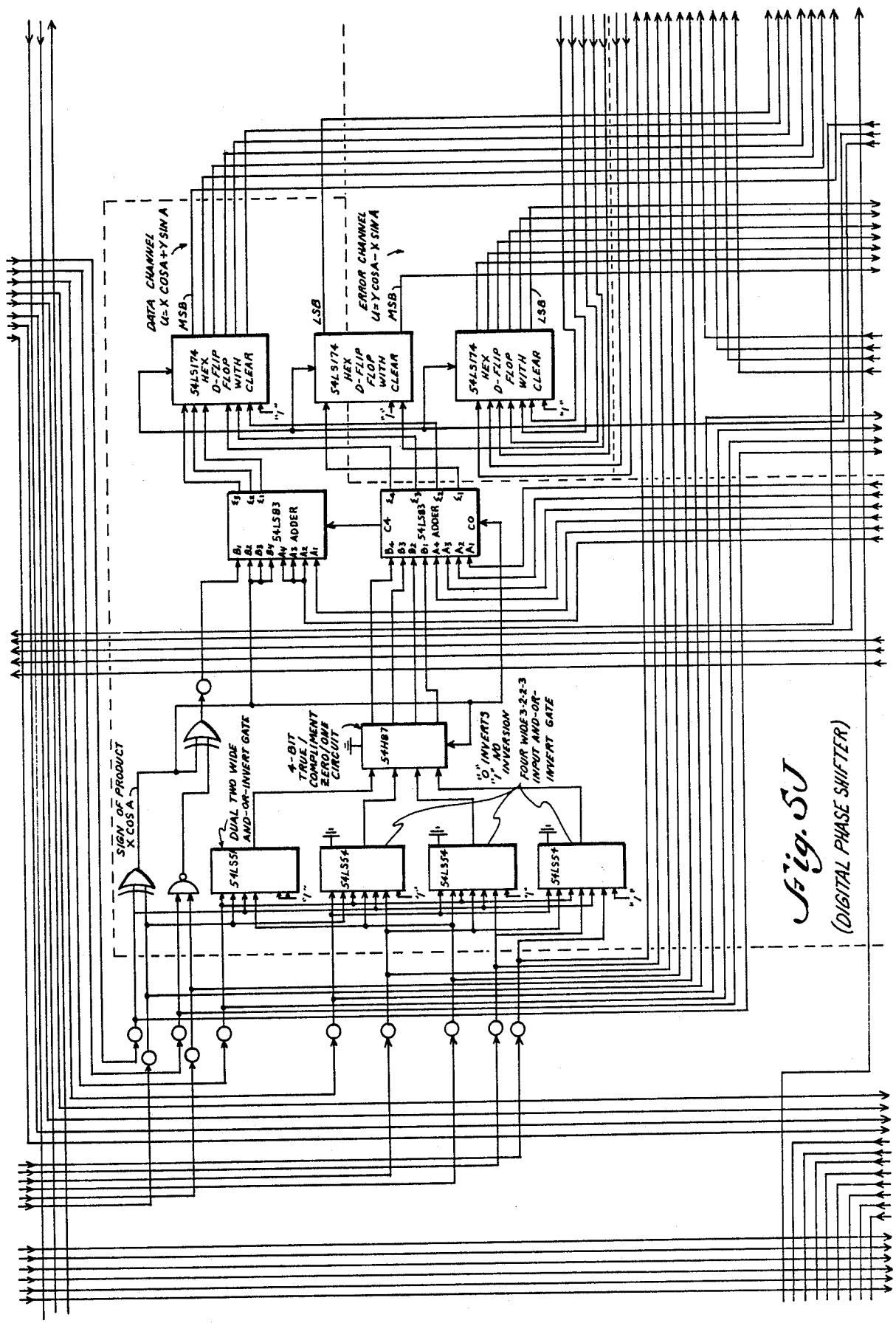
Fig. 5J (DIGITAL PHASE SHIFTER)

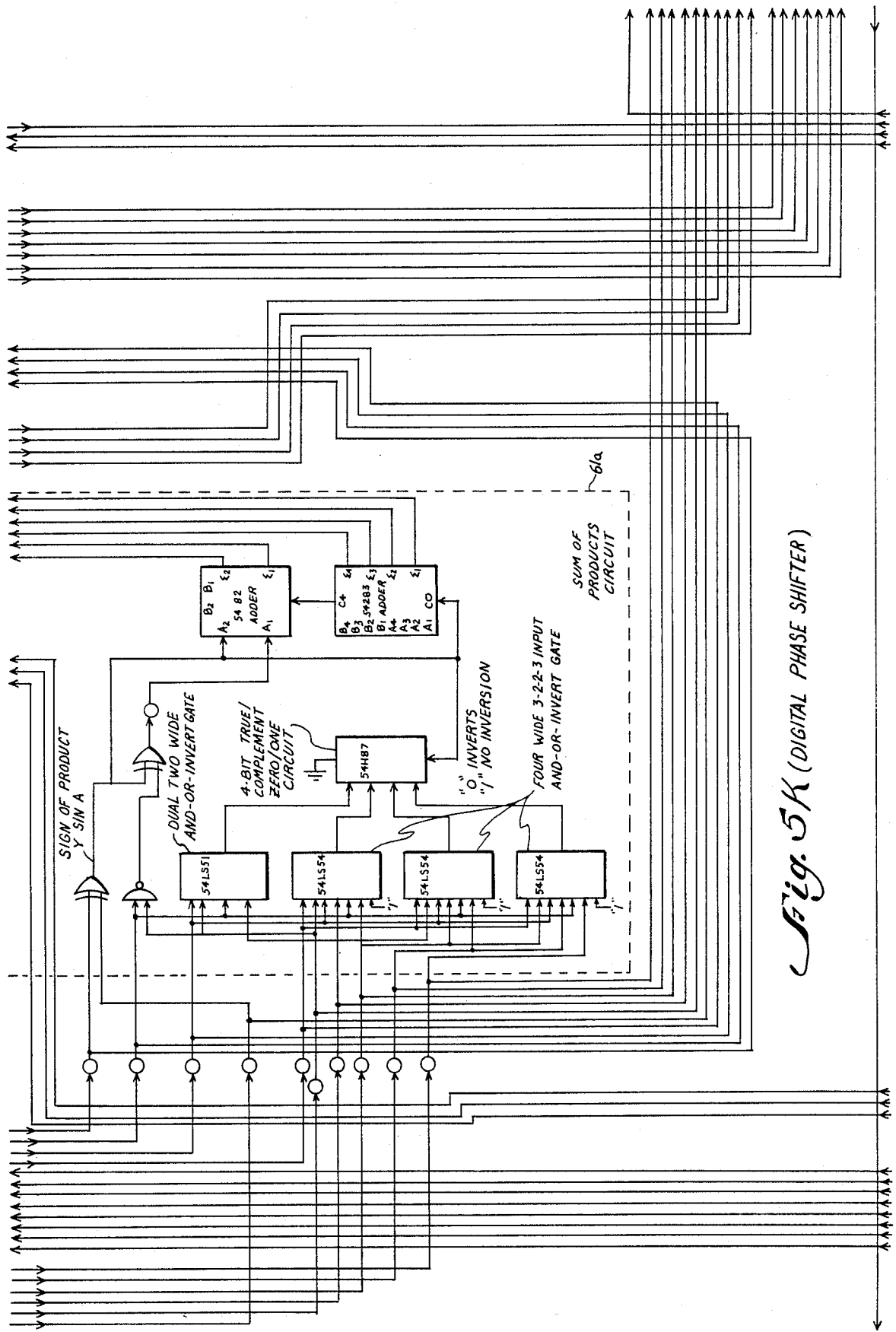
Fig. 5K (DIGITAL PHASE SHIFTER)

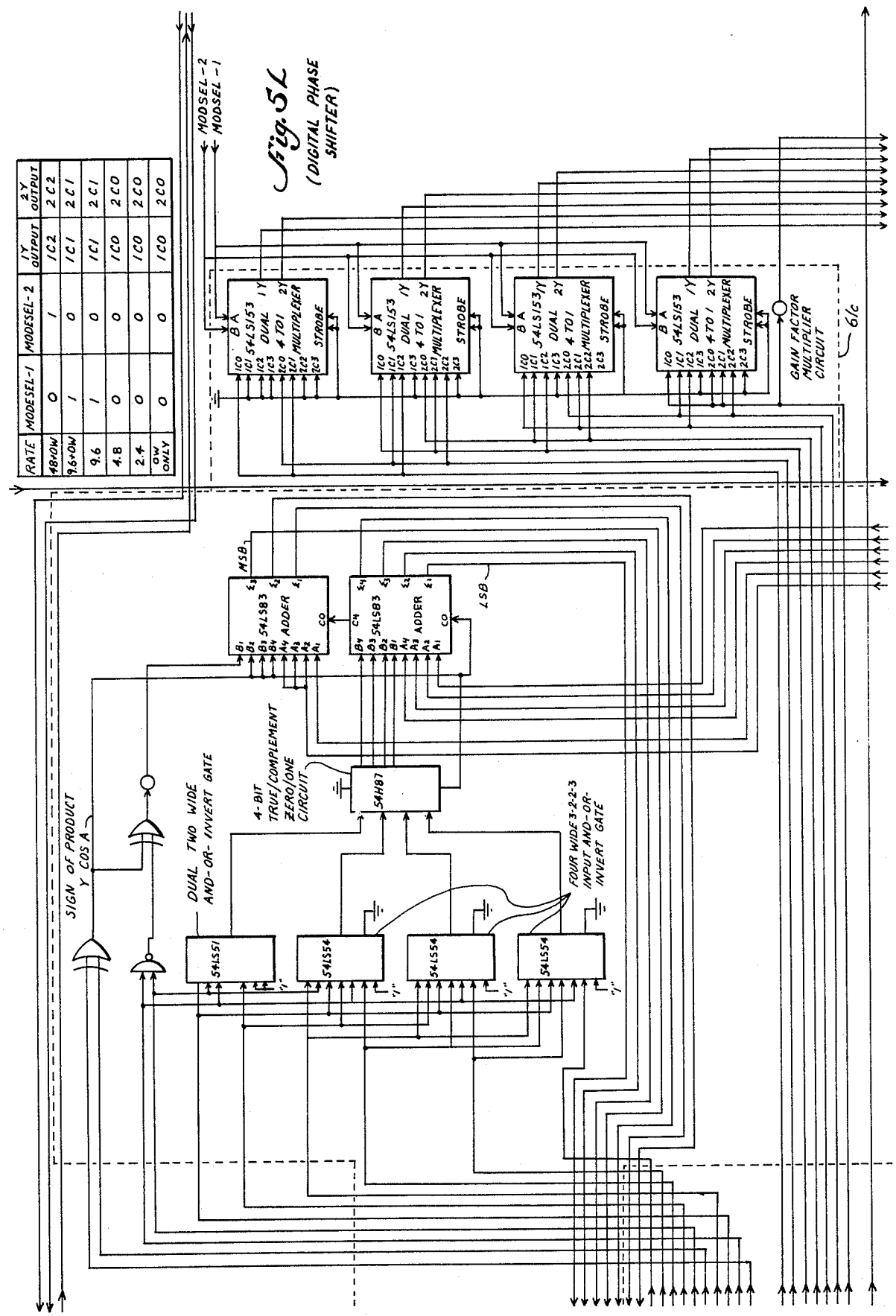
Fig. 5L (DIGITAL PHASE SHIFTER)

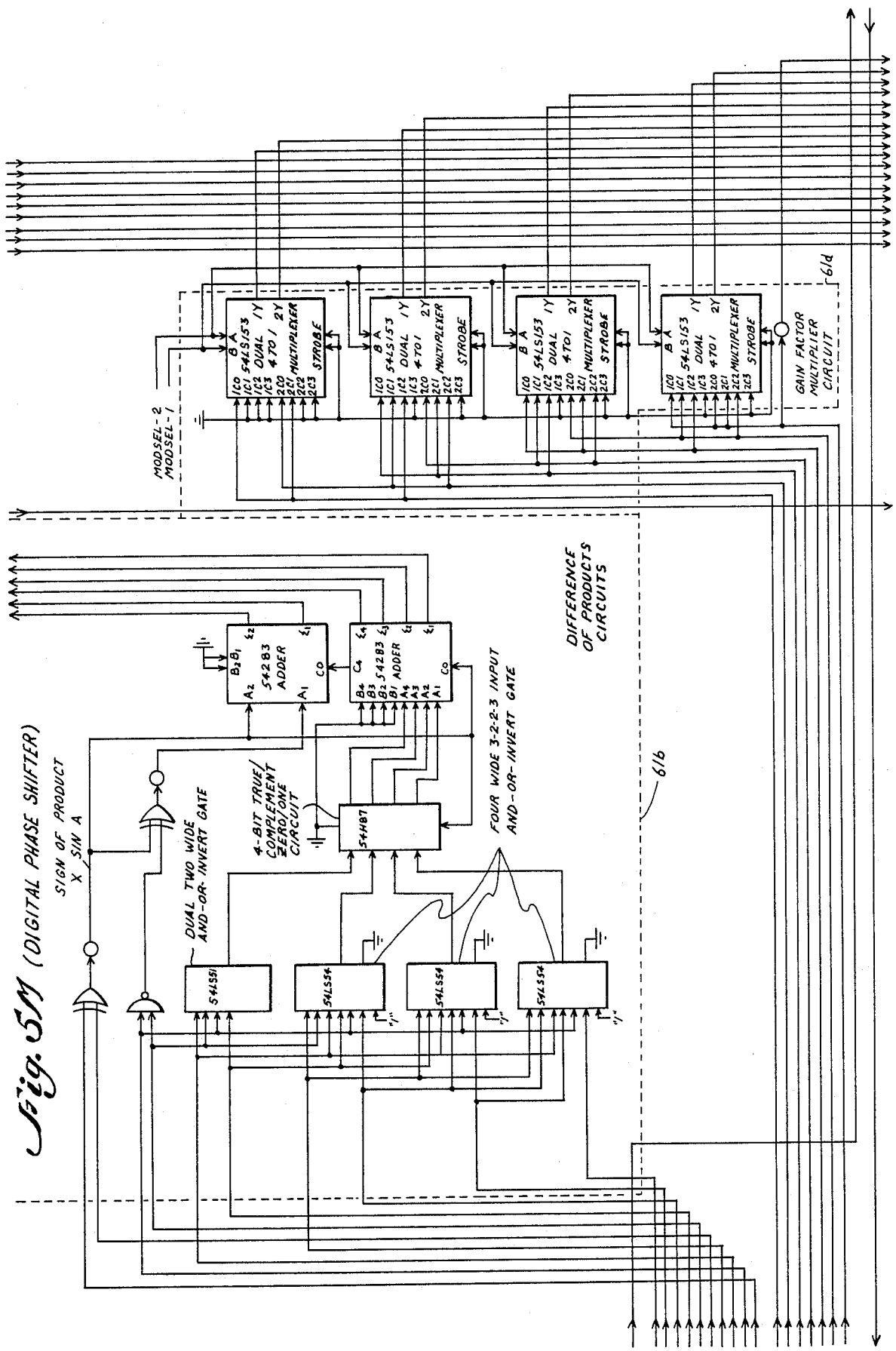

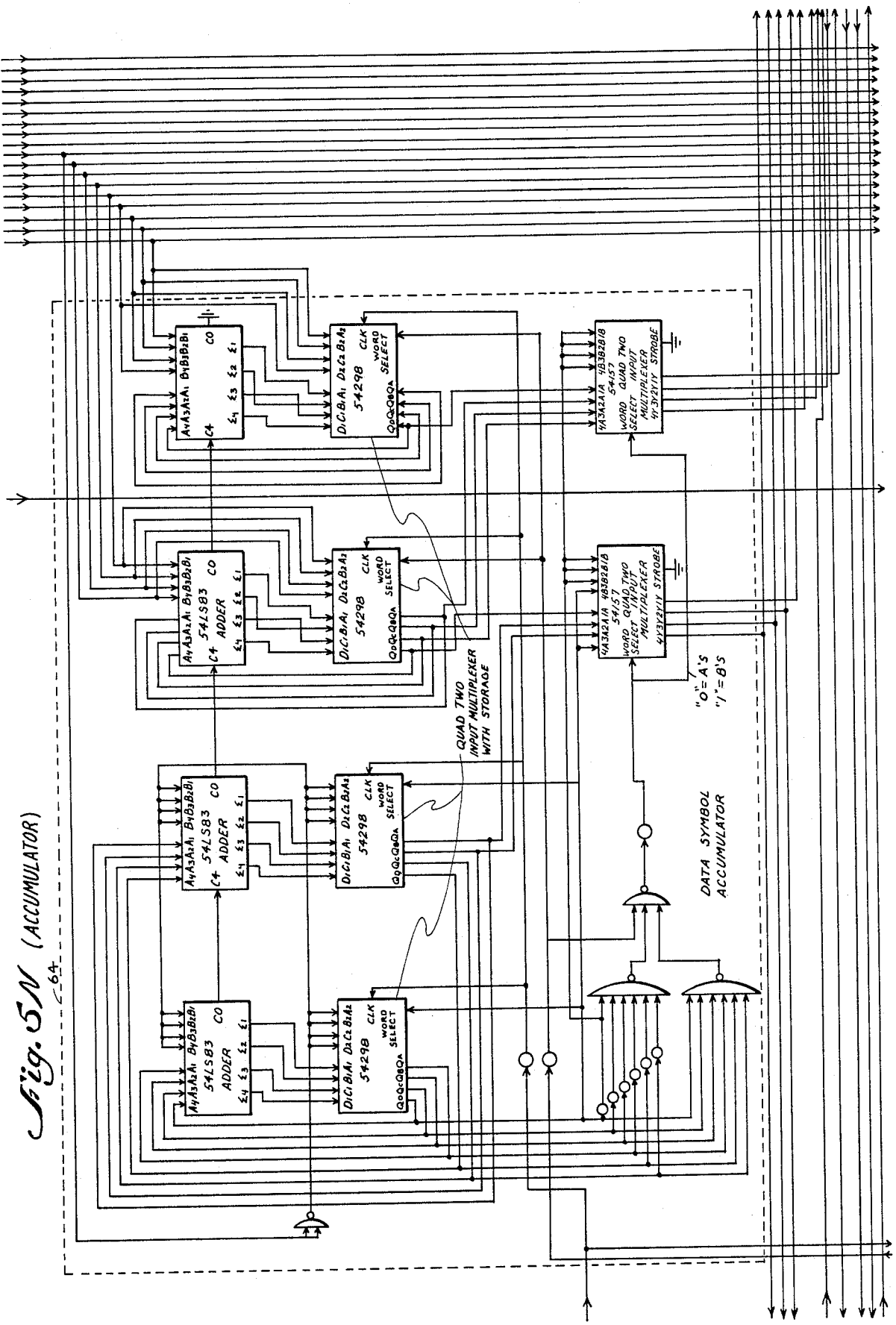

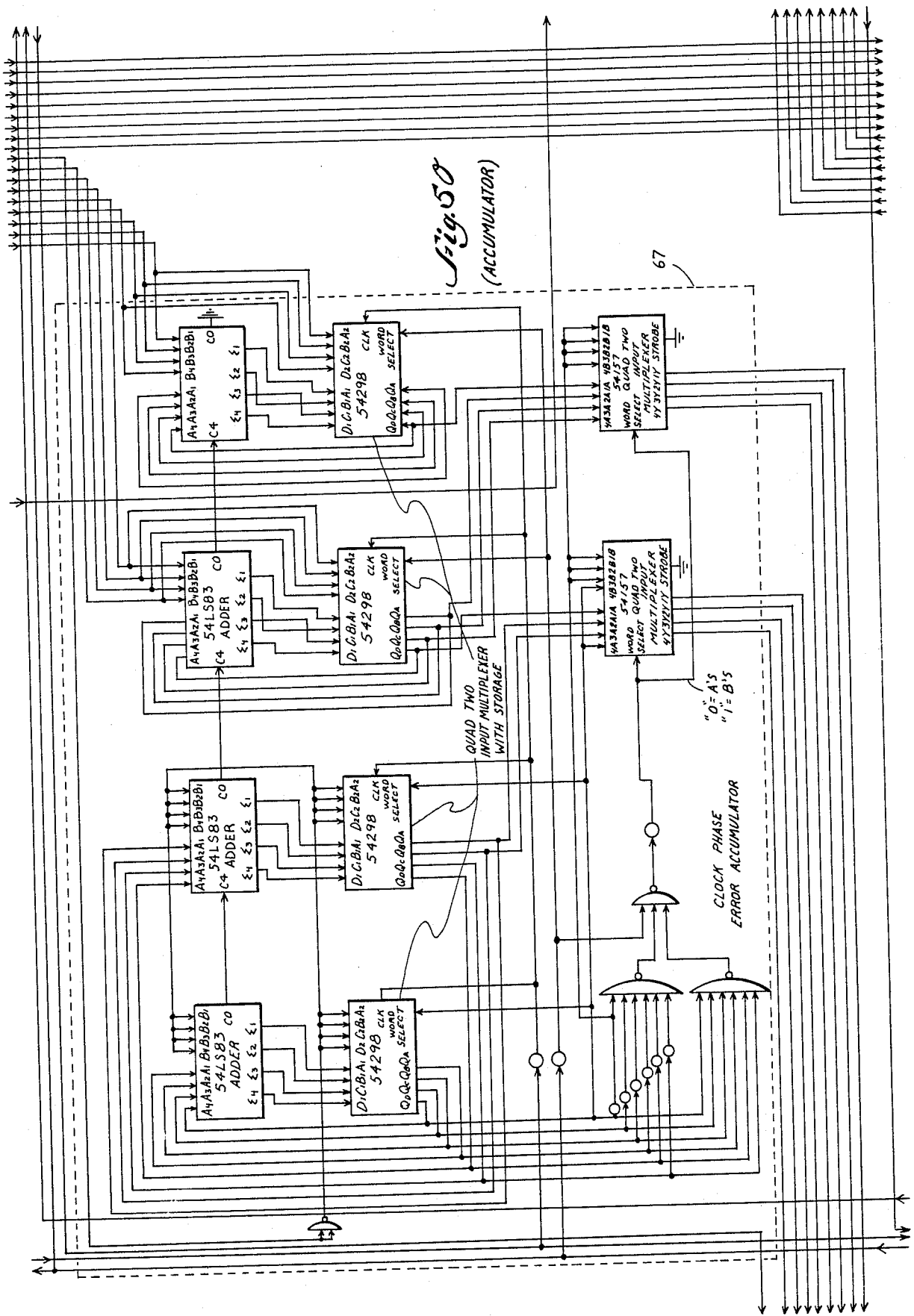

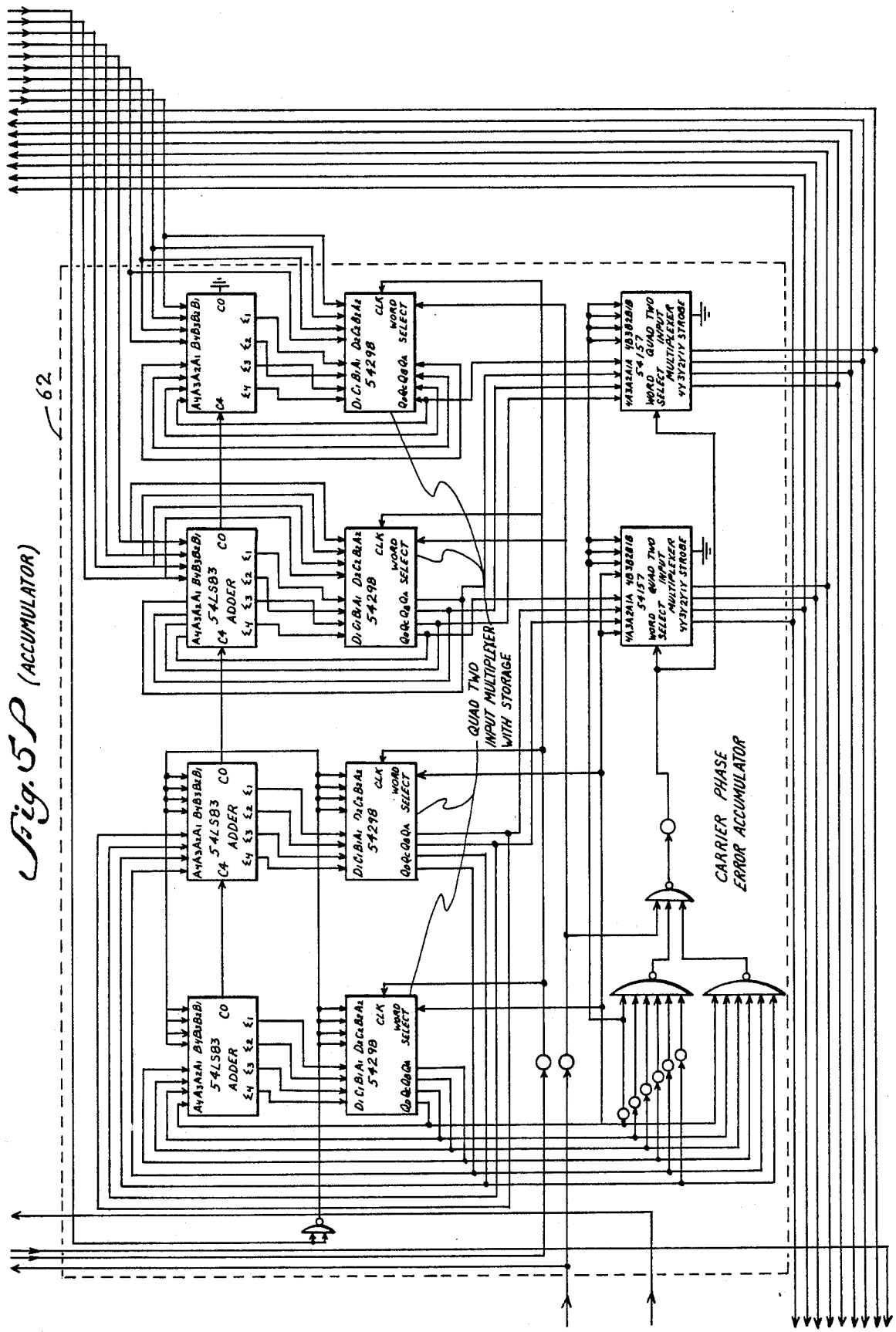

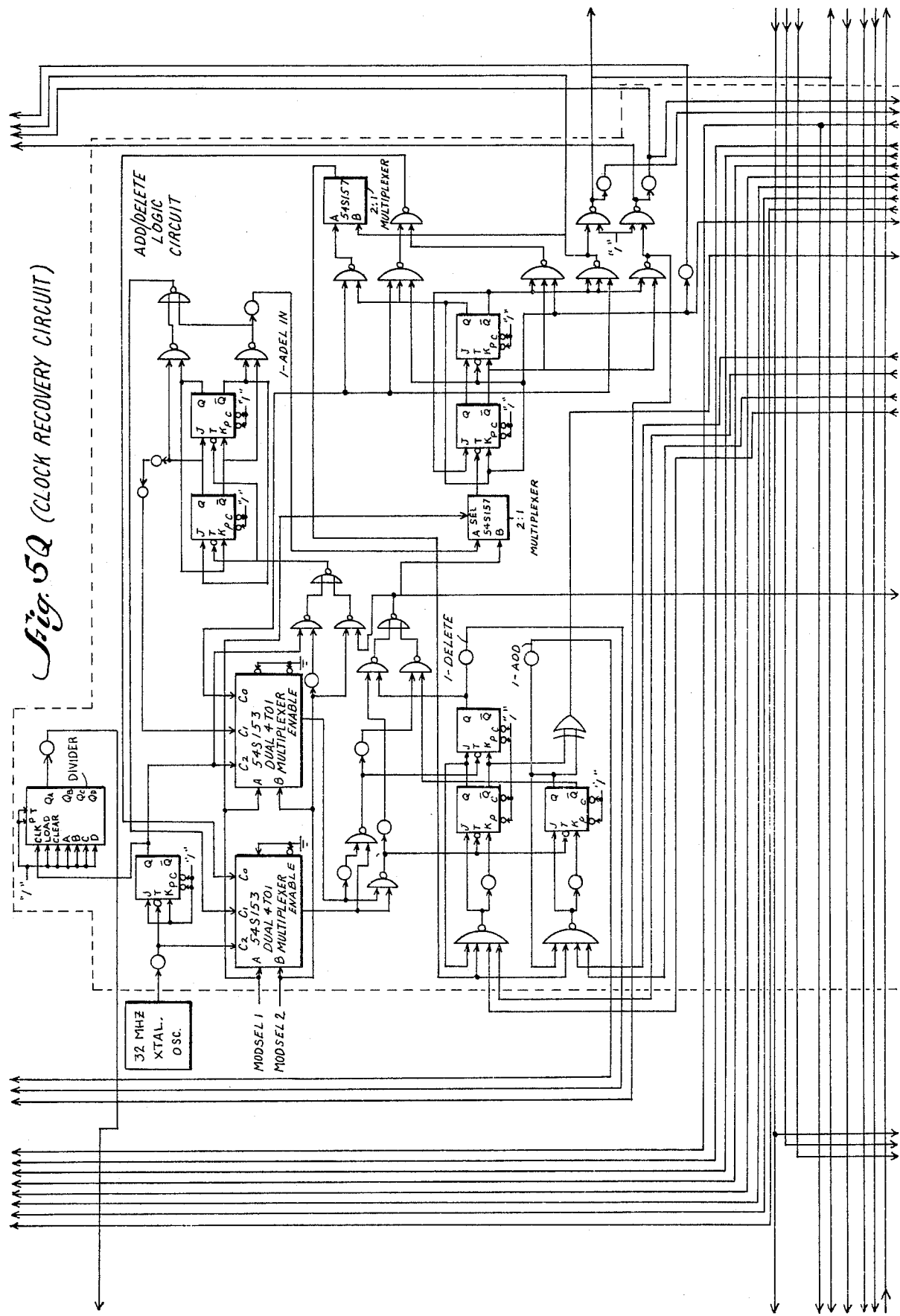

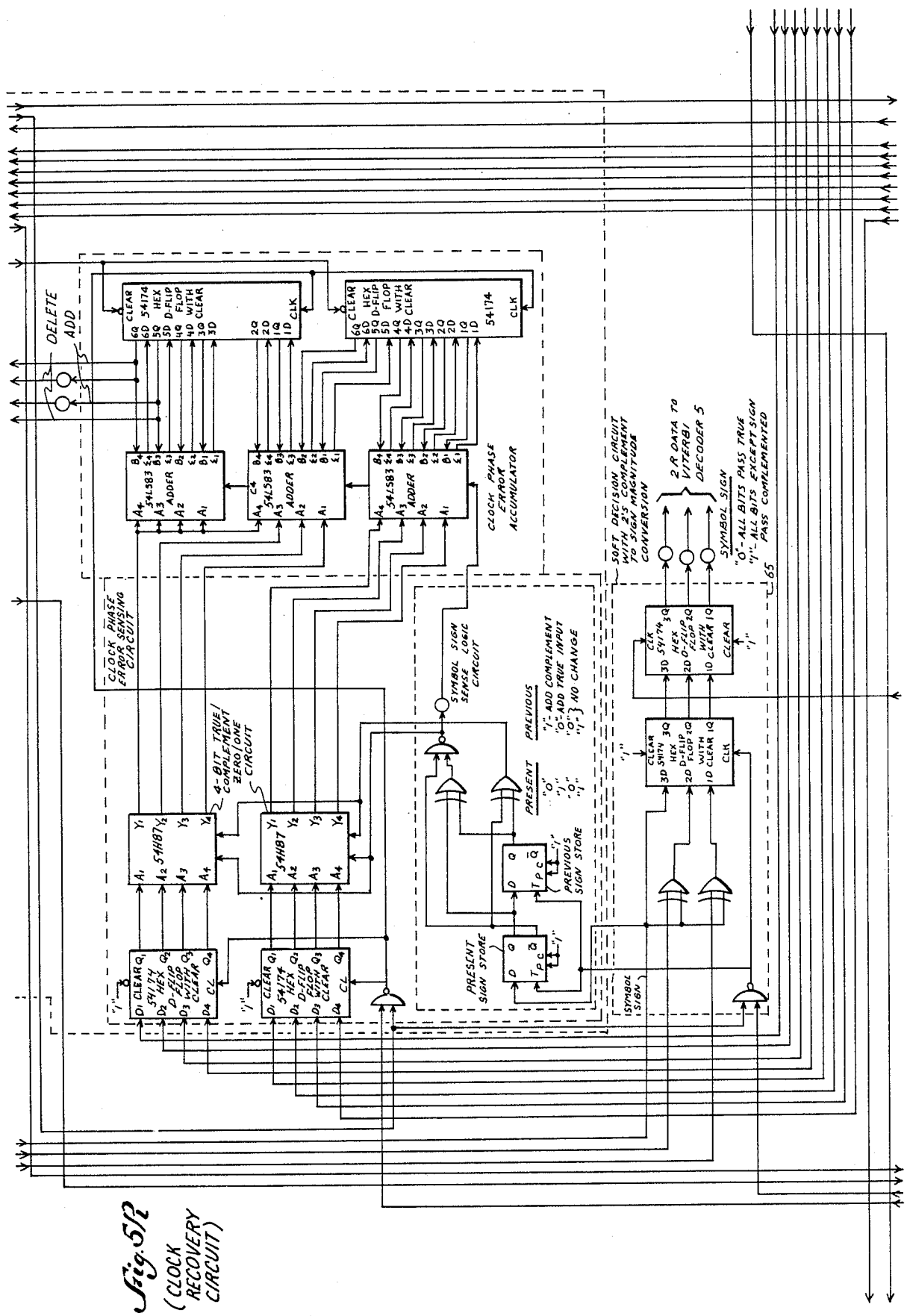
Fig. 51 (CLOCK RECOVERY CIRCUIT)

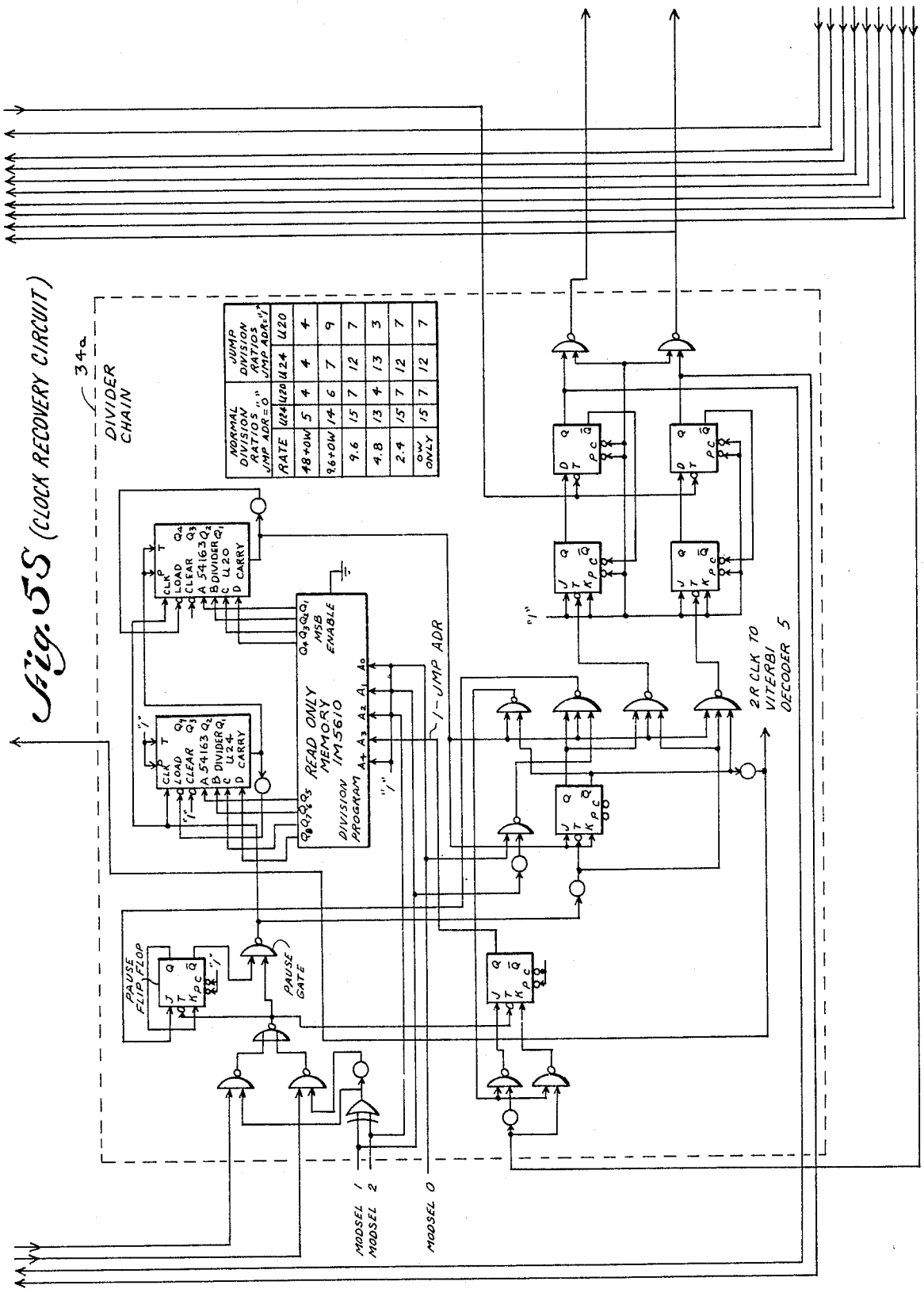
Fig. 5S (CLOCK RECOVERY CIRCUIT)

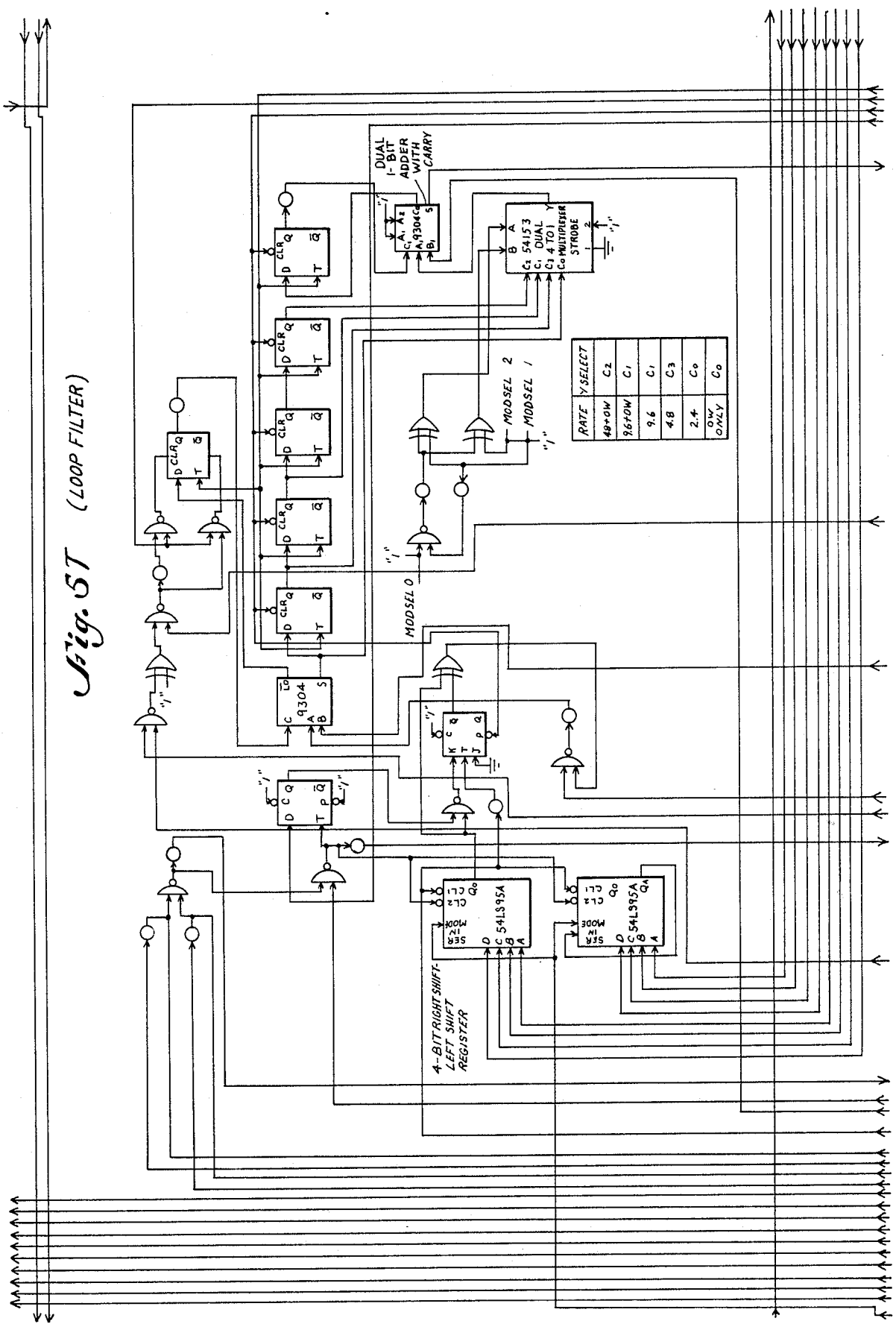
Fig. 5T (LOOP FILTER)

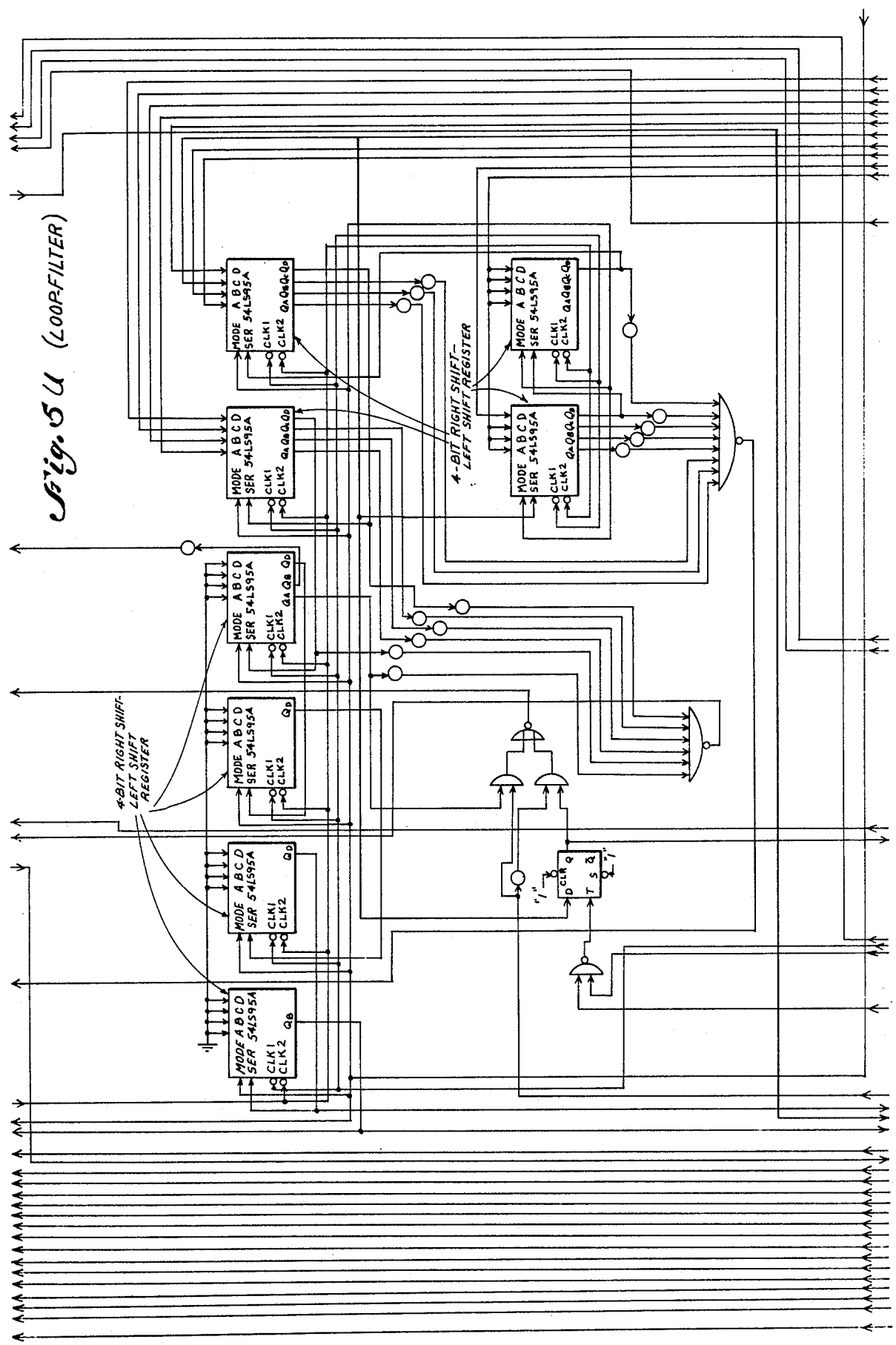

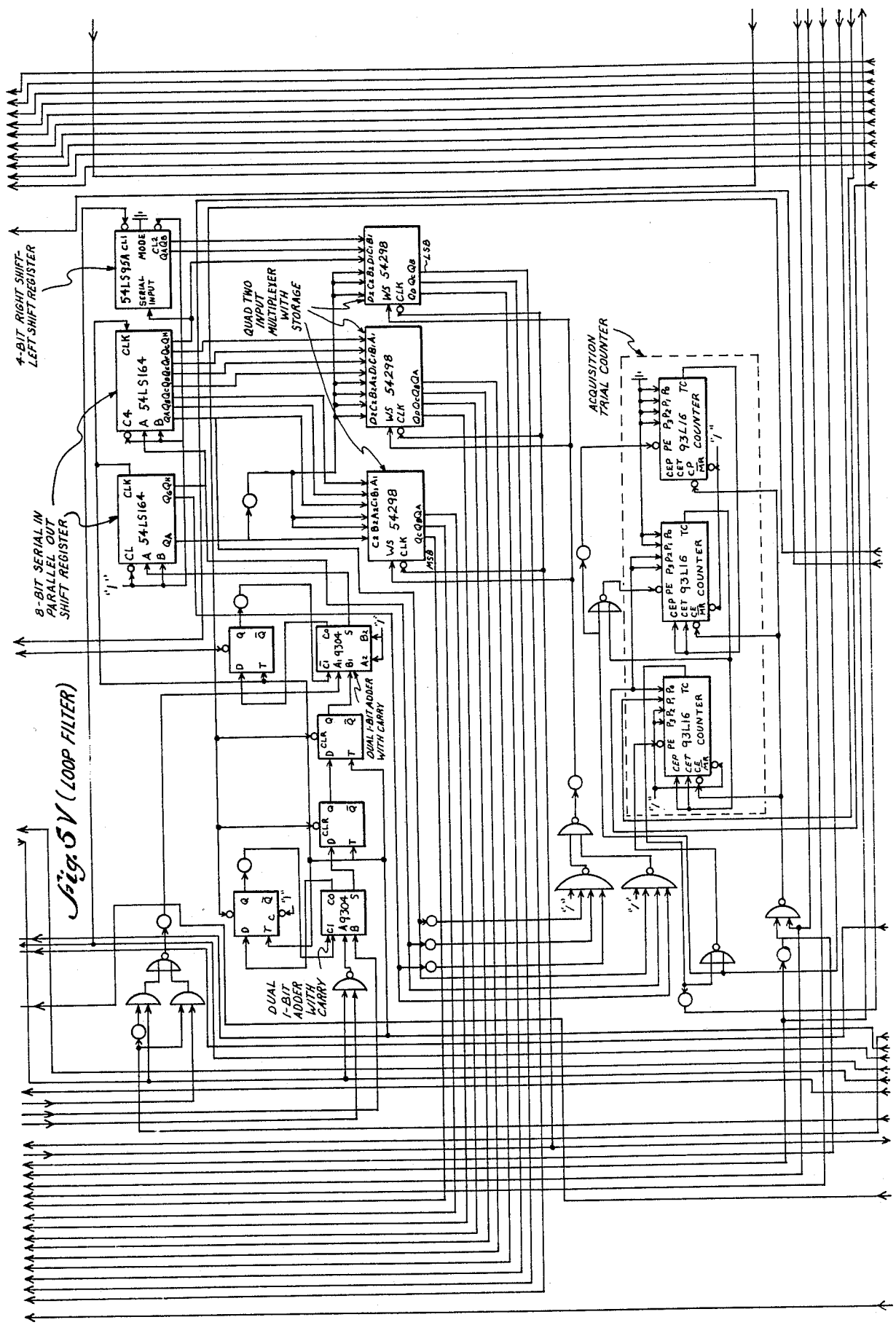

(LOOP FILTER)

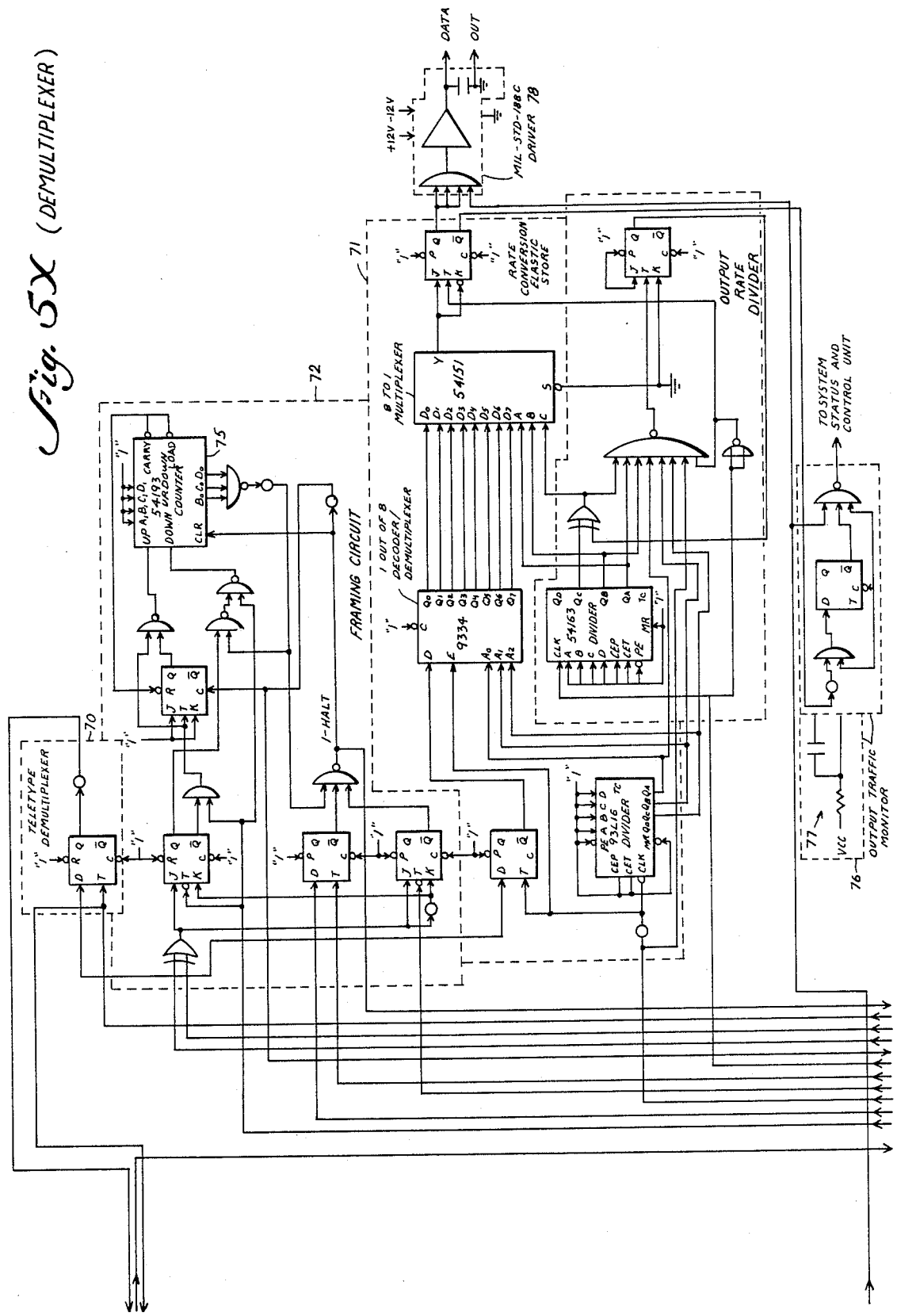
Fig. 5X (DEMULTIPLEXER)

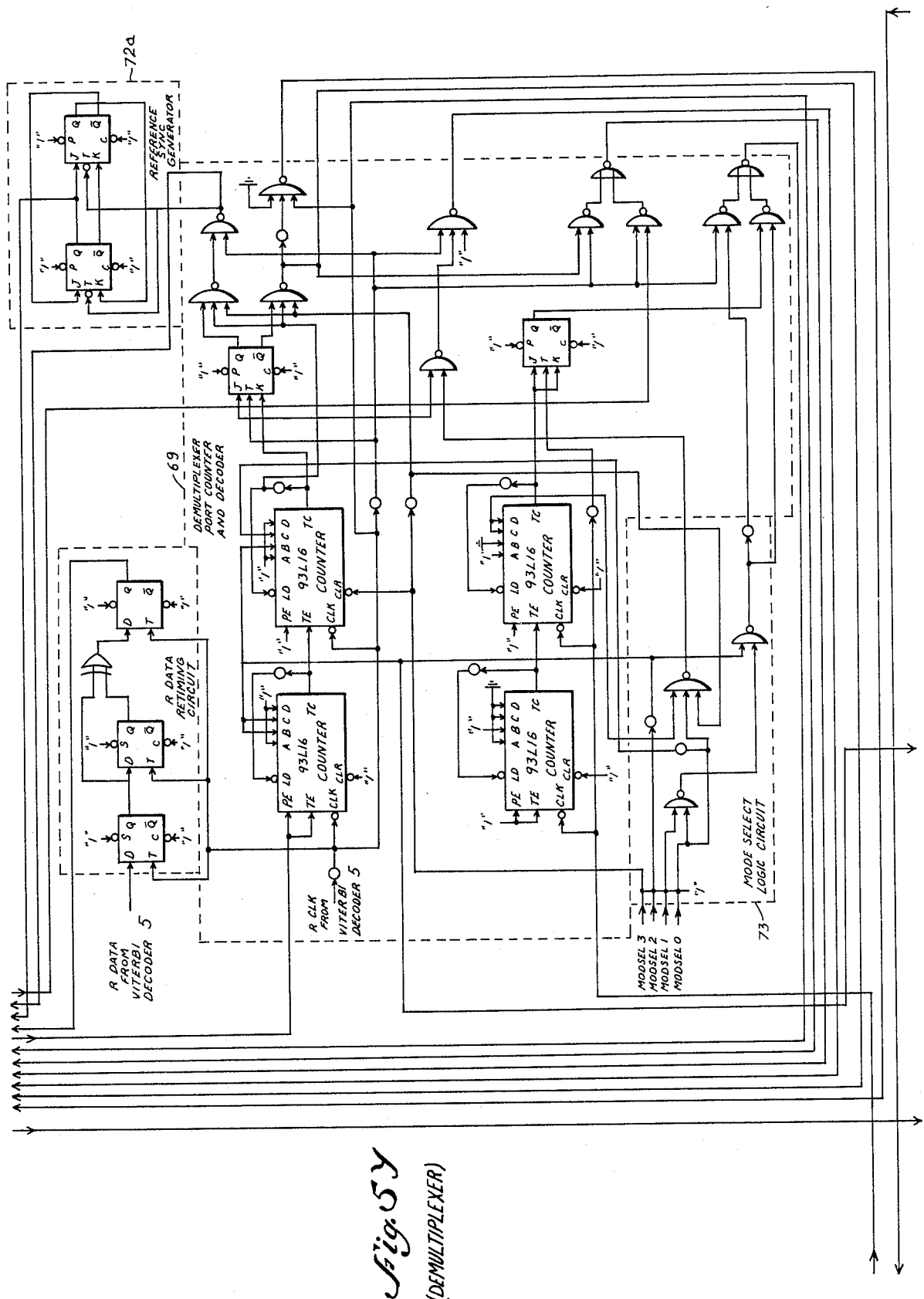
Fig. 5Y (DEMULTIPLEXER)

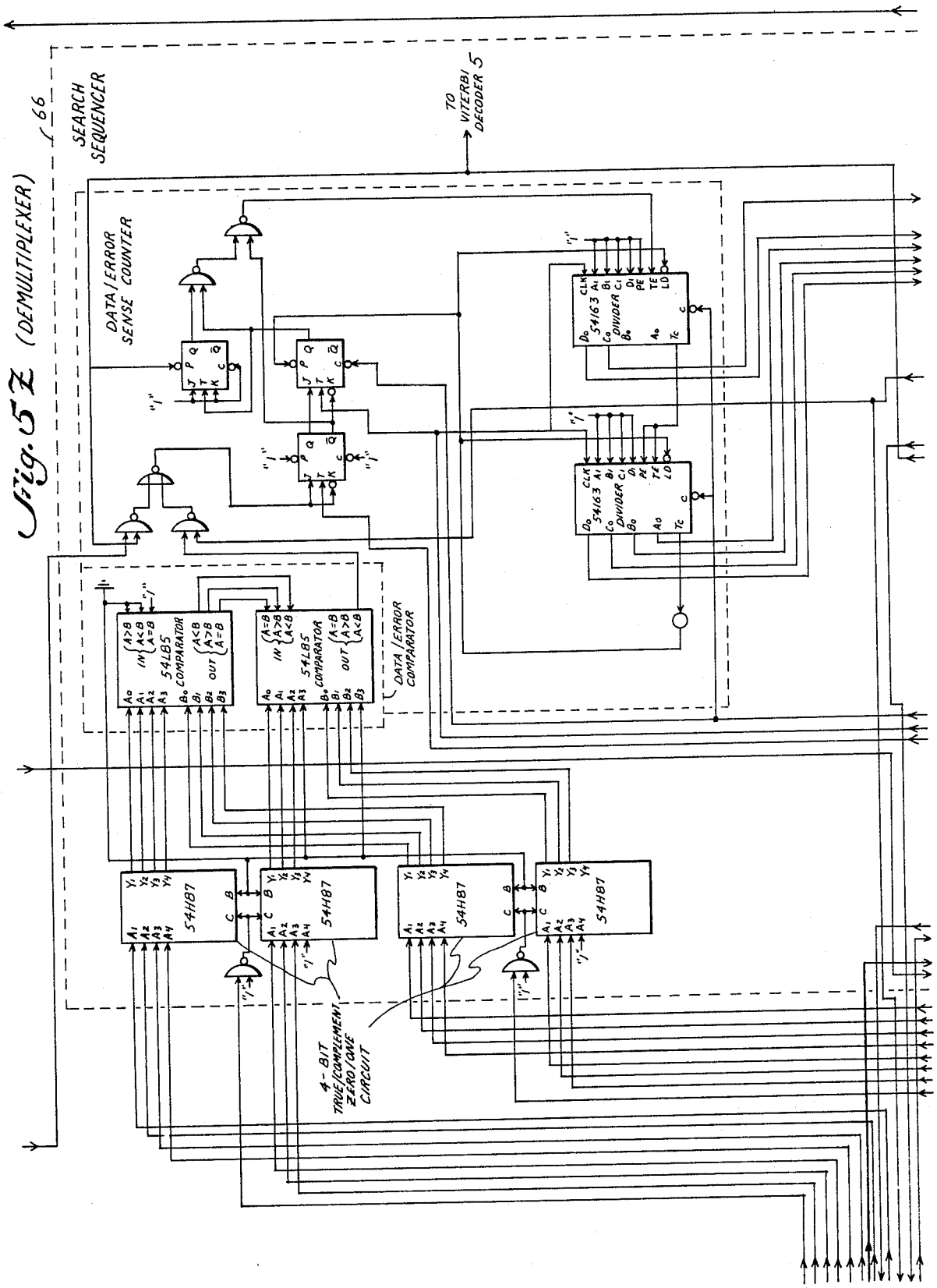

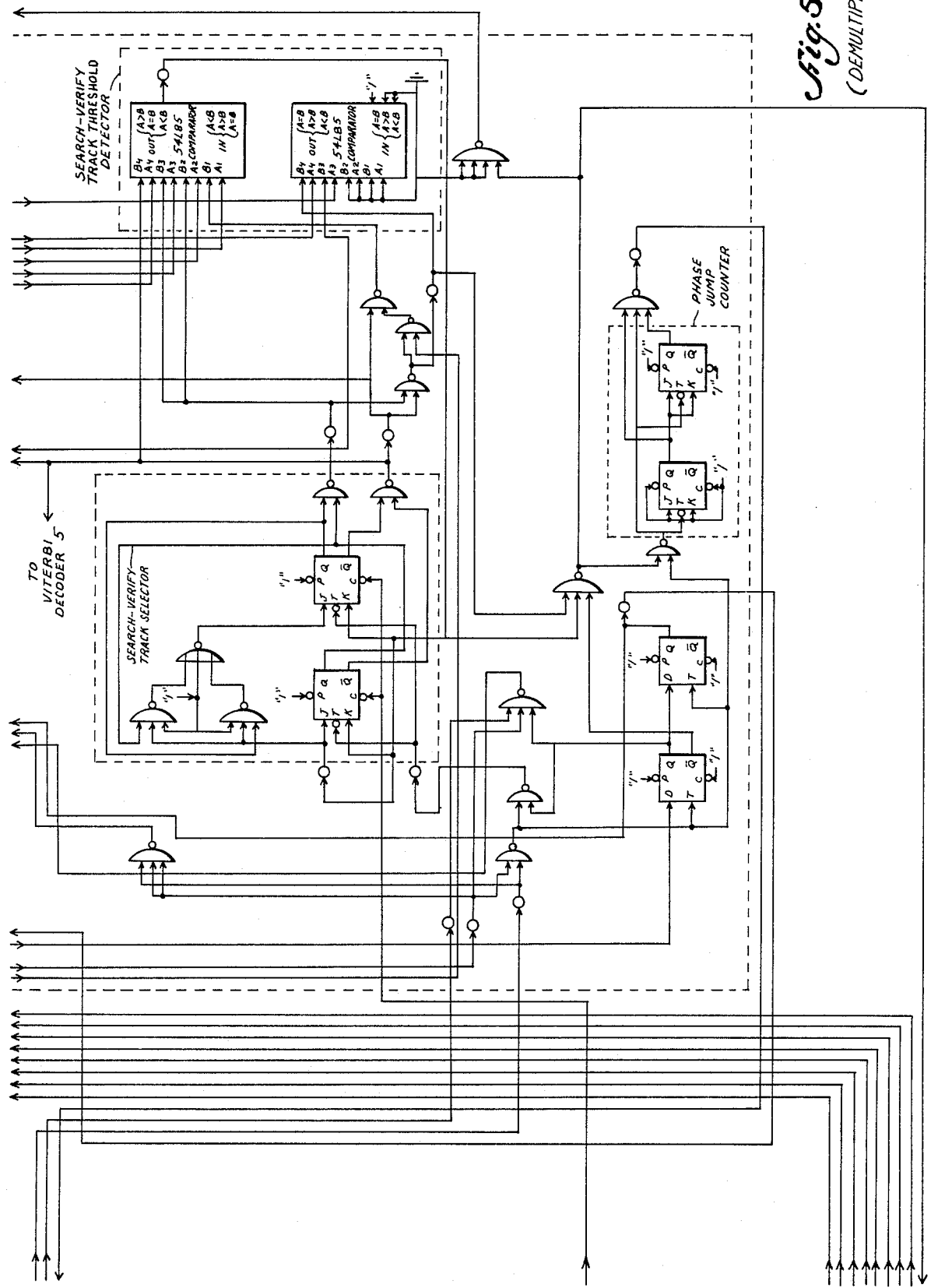
Fig.5AA (DEMULTIPLEXER)

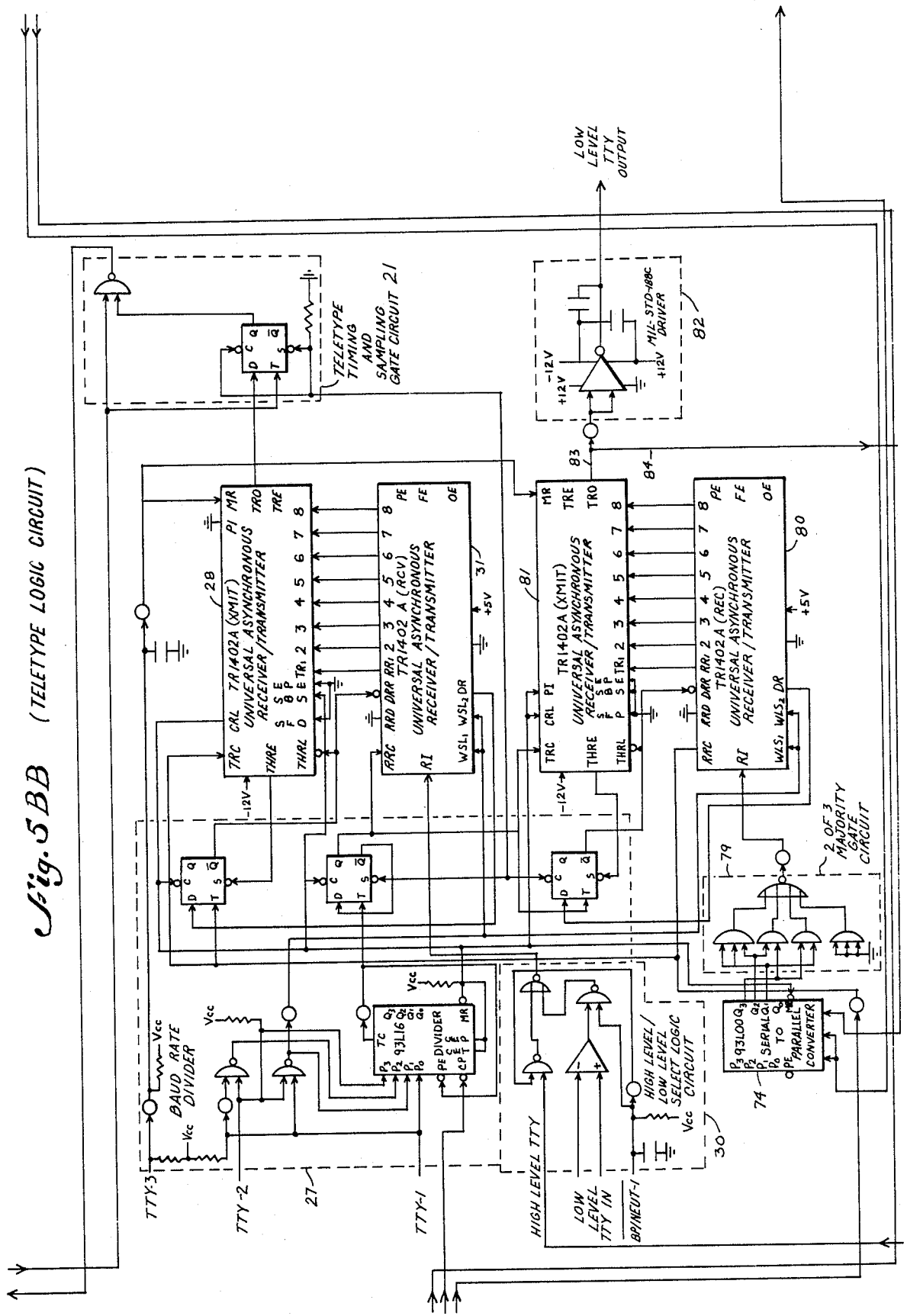

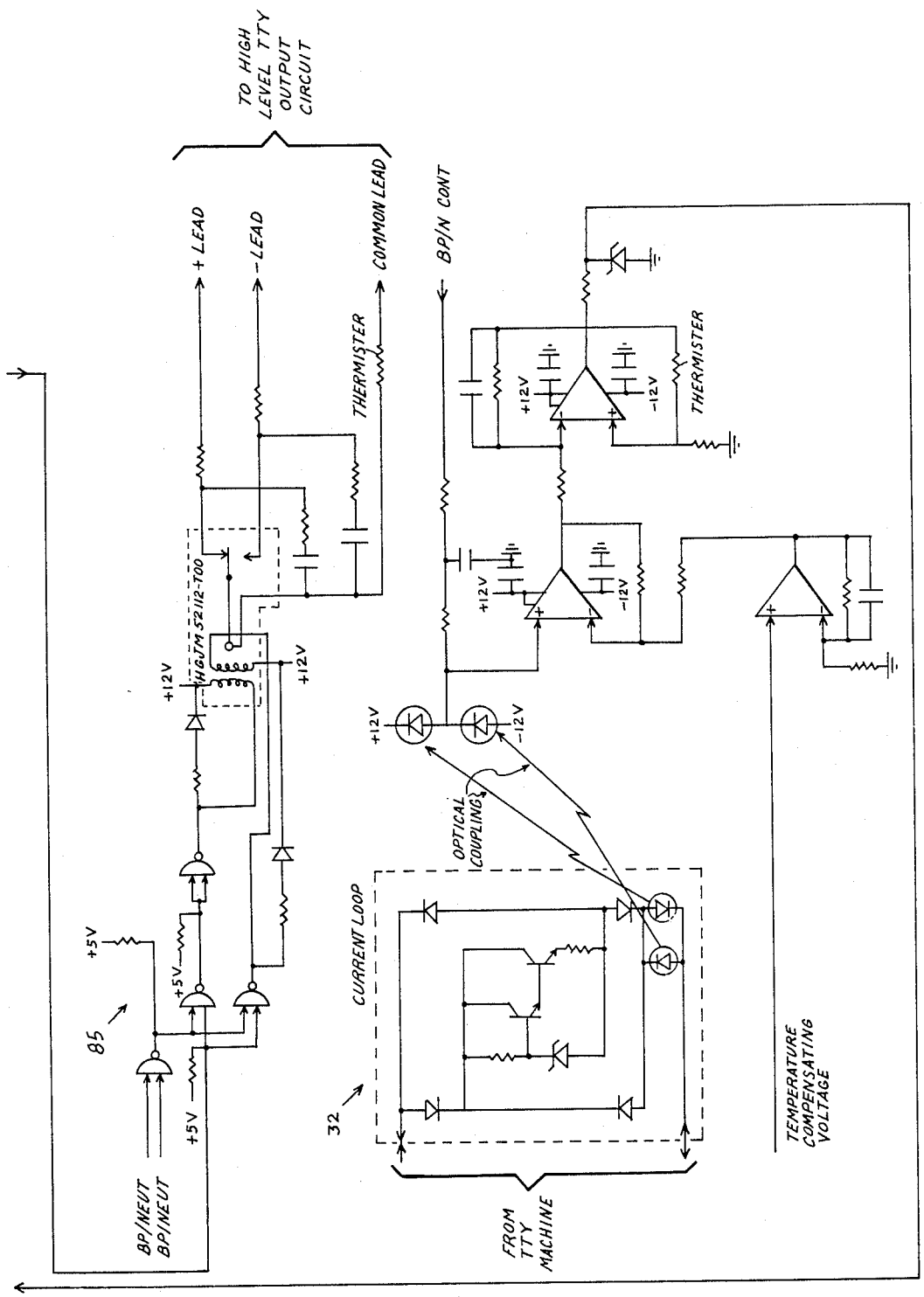
Fig. 5CC (HIGH LEVEL TELETYPE INTERFACE)

DIGITAL PSK MODEM

BACKGROUND OF THE INVENTION

This invention relates to digital data communication systems and more particularly to a modem for such systems.

SUMMARY OF THE INVENTION

An object of the present invention is to provide a digital PSK (phase shift keyed) modem for digital data communication systems.

A feature of the present invention is the provision of a digital PSK modem comprising: a transmitter portion including first means to multiplex first digital data and first teletype signals to provide first digital data signals; second means coupled to the first means to convert the first digital data signals into second digital data signals having a different digital form than the first digital data signals; and third means coupled to the second means responsive to the second digital data signals to provide a first PSK signal for transmission; and a receiver portion including fourth means to receive a second PSK signal containing third digital data signals having multiplexed second digital data and second teletype signals; fifth means coupled to the fourth means to extract the third digital data signals from the second PSK signal; sixth means coupled to the fifth means to convert the third digital data signals into fourth digital data signals having a different digital form than the third digital data signals; and seventh means coupled to the sixth means responsive to the fourth digital data signals to separate the second digital data and the second teletype signals for utilization.

Another feature of the present invention is the provision of a transmitter portion for a digital PSK (phase shift keyed) modem comprising: first means to multiplex digital data and teletype signals to provide first digital data signals; second means coupled to the first means to convert the first digital data signals into second digital data signals having a different digital form than the first digital data signals; and third means coupled to the second means responsive to the second digital data signals to provide a PSK signal for transmission.

Still another feature of the present invention is the provision of a receiver portion for a digital PSK modem comprising first means to receive a PSK signal containing first digital data signals having multiplexed digital data and teletype signals; second means coupled to the first means to extract the first digital data signals from the PSK signal; third means coupled to the second means to convert the first digital data signal into second digital data signals having a different digital form than the first digital data signals; and fourth means coupled to the third means responsive to the second digital data signals to separate the digital data and the teletype signals for utilization.

BRIEF DESCRIPTION OF THE DRAWING

Above-mentioned and other features and objects of this invention will become more apparent by reference to the following description taken in conjunction with the accompanying drawing, in which:

FIGS. 1A – 1F when organized as illustrated in FIG. 1G is a block diagram of the digital PSK modem in accordance with the principles of the present invention;

FIG. 2 is a schematic diagram of the mode selector switch of FIG. 1A;

FIG. 3 is a schematic diagram of the baud rate switch of FIG. 1B;

FIG. 4 is a schematic diagram of a bipolar, low level and neutral teletype switch of FIG. 1B.

DESCRIPTION OF THE PREFERRED EMBODIMENT

Figure 1A:
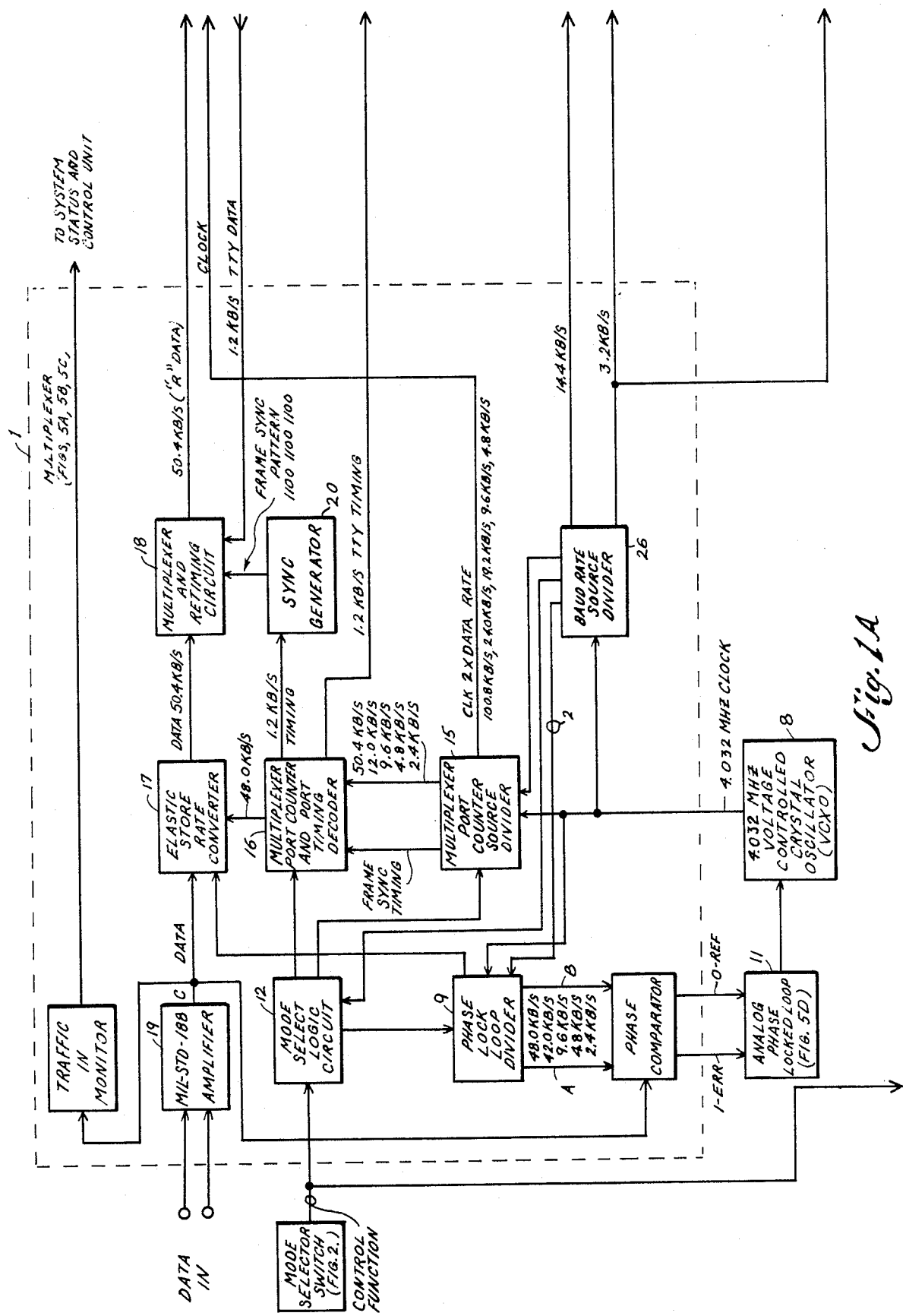

The digital PSK modem of the present invention is functionally sub-divided into two portions, a transmitter portion and a receiver portion. The transmitter portion includes the components of FIGS. 1A and 1B, which includes a multiplexer 1 which accepts orderwire teletype signals and digital data input signals which are combined in one of six selective modes of operation; namely, teletype orderwire only mode, three data only modes and two data plus teletype orderwire modes. The digital signals having the selected mode of operation are encoded in a convolutional encoder such as the Viterbi coder 2 and applied to the input of the PSK modulator 3. At modulator 3, the encoded symbols modulate the 70 MHz (megahertz) carrier producing 180° phase shift in the carrier. In the receiver portion as illustrated in FIGS. 1C, 1D, 1E and 1F, the received 70 MHz IF signals is applied to the input of PSK demodulator 4. At the demodulator 4 the two-phase symbol stream is demodulated into a digital data signal and applied to the Viterbi decoder 5 where the symbols of the input digital data signals are decoded or converted into a digital information stream having a digital form different than the form of the digital data signals applied to the input of the Viterbi decoder 5. The output of decoder 5 is applied to demultiplexer 6 where the information data is demultiplexed producing high-speed data and teletype orderwise outputs.

Figure 5A:
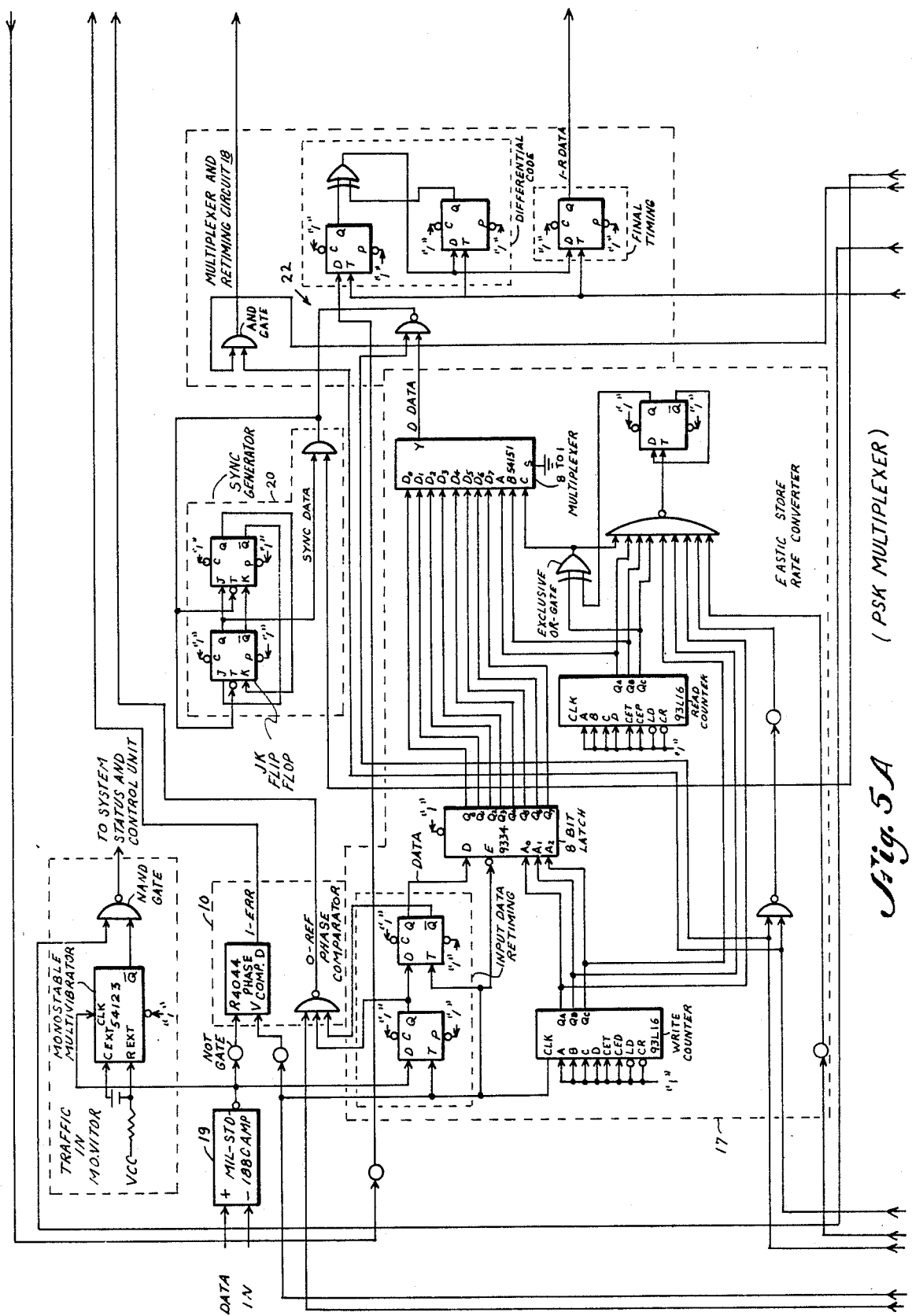
FIGS. 5A – 5CC when organized as illustrated in FIG. 5DD is a logic diagram implementing the digital PSK modem of FIGS. 1A – 1F in accordance with the principles of the present invention.
Figure 5W:
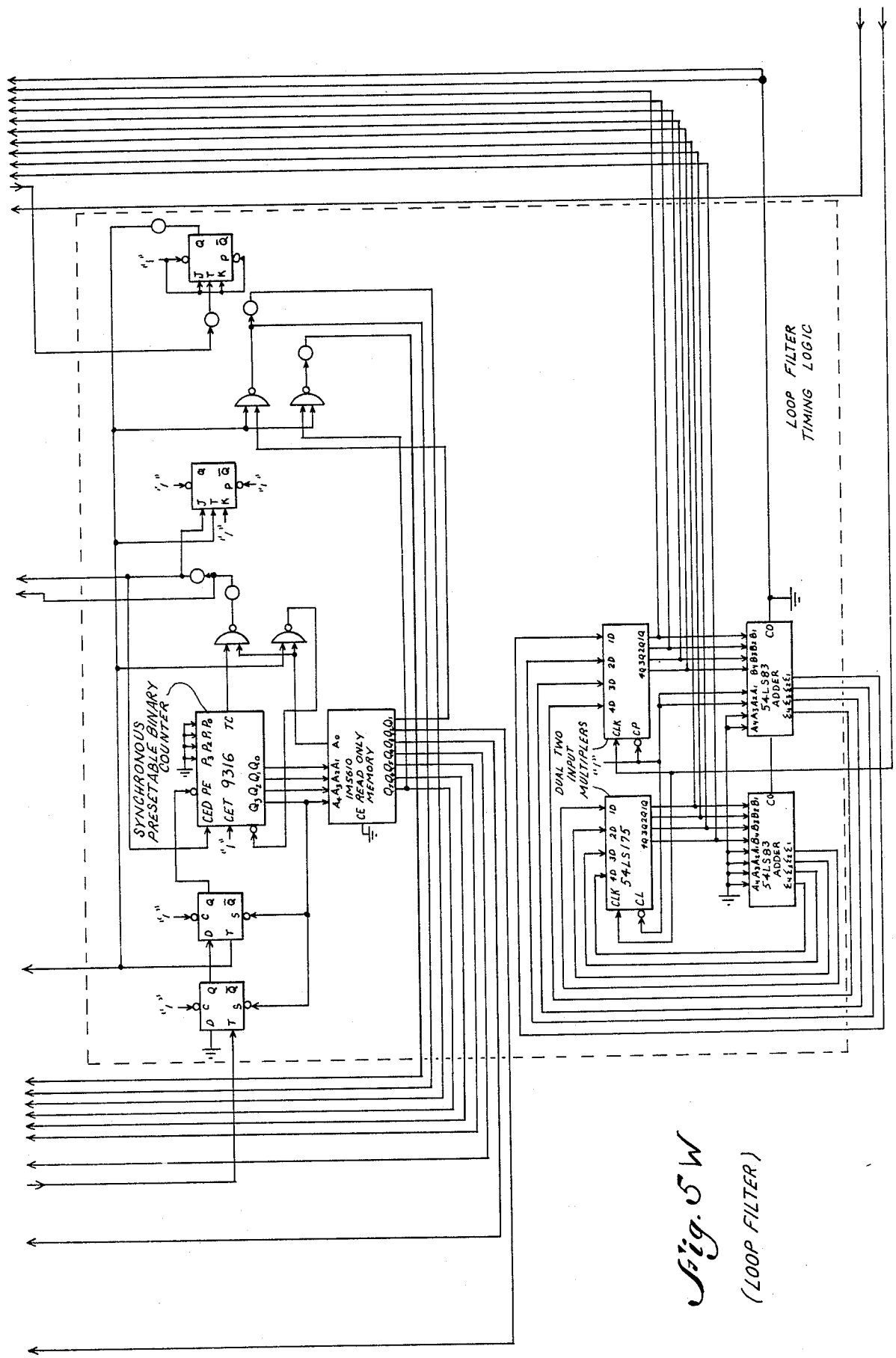

The following detailed description of the operation and implementation of the digital PSK modem of the present invention will now be described with reference to FIGS. 1A – 1F when organized as illustrated in FIG. 1G and also with respect to the FIGS. 5A – 5CC when organized as illustrated in FIG. 5DD. In the logic circuity of FIG. 5, one of the different gates employed and one of the different flip flops employed have a legend applied thereto which provides a legend for the various gates and flip flops employed in the logic circuitry.

In the transmitter portion, the digital PSK modem of the present invention combines the data and the teletype orderwire signals in a number of modes of operations, and codes the combined data and generates a 70 MHz biphase modulated digital signal via the operation of multiplexer 1, Viterbi coder 2, teletype logic circuit 7 and the PSK modulator 3. A detailed explanation of each component is provided hereinbelow.

Multiplexer 1 provides four individual operations. It recovers a clock from the incoming digital data signals, multiplexes the digital data signals orderwire teletype orderwise signals, provides clock timing signals to teletype logic circuit 7 and generates a frame sync pattern. The logic circuit implementation of multiplexer 1 is illustrated in FIGS. 5A, 5B and 5C.

Clock recovering is accomplished via a phase locked loop including a 4.032 MHz voltage controlled crystal oscillator 8, a phase locked loop divider 9, a phase comparator 10 and an analog phase locked loop 11 which is implemented as illustrated in FIG. 5D. The 4.032 MHz clock output signal from oscillaor 8 is fed to divider 9. In divider 9 the 4.032 MHz clock signal is counted down to produce two-phase clock output signals A and B at the same rate as the incoming data. The division rate of divider 9 is controlled by the mode select logic circuit 12. The two-phase output signals A and B generated by the phase locked loop divider 9 are applied to phase comparator 10 which measures the difference in the two-phase clocks and incoming data producing a pair of control output signals (reference O-REF and error 1-ERR) which are applied to the analog phase locked loop 11. The analog phase locked loop 11 as shown in FIG. 5D includes a current amplifier and filter 13 which sense the direction of the error signals from phase comparator 10. At the analog phase locked loop 11a correction voltage is developed in the difference amplifier circuit 14 which is applied to oscillator 8 which changes its output from its natural frequency to that of the incoming signal. Thus, a clock signal is developed which is at the correct frequency and phase locked to the incoming data signal.

Multiplexing of the incoming digital data with the orderwire teletype and the local frame sync signal is accomplished via the port counter source divider 15, the multiplexer port counter and port timing decoder 16, shown in FIG. 5B as multiplexer port counter 16a and port timing decoder 16b, elastic store rate converter 17 and the multiplexer and retiming circuit 18. When the clock recovery circuit has acquired and locked to the rate of the incoming data signal the 4.032 MHz output signal from oscillator 8 is applied to the port counter source divider 15 where the input signal 4.032 MHz is counted down. The division ratio of source divider 15 is controlled by the mode select logic circuit 12 and the mode selector switch S3 which is schematically illustrated in FIG. 2. Source divider 15 produces a clock at the final output rate and applies it to the multiplex port counter and port timing decoder 16. In the multiplex port counter and port timing decoder 16 the 50.4 and 12.0 KB/S (kilobits per second) rates are further sub-divided to a 48.0 KB/S clock and two 1.2 KB/S clocks or a 9.6 KB/S clock and two 1.2 KB/S clocks, which are applied to elastic store rate converter 17. Converter 17 receives a data input signal from the MIL-STD-188C amplifier 19 which changes the digital data levels to compatible TTL levels for the logic circuits of FIGS. 5A – 5CC. When the mode selector switch S3 is set to 48 KB/S data plus orderwire teletype mode, converter 17 receives a 48 KB/S data stream which is converted from 48 KB/S to 50.4 KB/S so that it can be multiplexed with a frame sync signal from sync generator 20 and the input from the teletype logic circuit 7. Converter 17 functions as a temporary memory in which data can be read in at one rate and read out at a second rate. The data signal into converter 17 is clocked into a temporary memory at 48.0 KB/S. The clock output signals from counter and decoder 16 are generated initially at 50.4 KB/S having every 21st clock pulse deleted. This deletion causes a pause in the read out of converter 17. During this pause a sync clock output pulse from sync generator 20 or a 1.2 KB/S teletype data from the teletype timing and sampling gate 21, implemented as shown in FIG. 5BB, is inserted into multiplexer and retiming circuit 18. The data is read out of converter 17 at an instantaneous rate of 50.4 KB/S, but with the deletion of every 21st clock pulse in the frame produces an average read out rate of 48.0 KB/S, thus preventing overflow or underflow of converter 17. The 48.0 KB/S average data rate output signal from converter 17 is applied to multiplexer and retiming circuit 18. The multiplexer portion 22 (FIG. 5A) of the multiplexer and retiming circuit 18 receives three input signals, one from the converter 17, one from sync generator 20 and one from teletype timing and sampling gate circuit 21. The input format to the multiplexer and retiming circuit 18 when 48.0 KB/S plus orderwire teletype mode is selected is composed of twenty bits of data from converter 17, one sync bit from sync generator 20, twenty bits of data from converter 17, one teletype bit from gate circuit 21, twenty bits of data from converter 17, one sync bit from generator 20, followed by twenty bits of data from converter 17 and one TTY bit from gate circuit 21. This data is then combined and retimed in the retiming portion 23 (FIG. 5A) of multiplexer and retiming circuit 18 producing a final output format of 50.4 KB/S which is coupled to the Viterbi coder 2. The convolutional Viterbi coder is a rate ½ coder contaning a binary shift register and two modulo two adders connected to several stages of the shift register. The information bits are shifted into the encoder shift register a bit at a time. After each bit shift the outputs of the two modulo two adders are sampled, sequentially yielding two symbol bits for each input data bit. The symbols from coder 2 are applied to the PSK modulator 3 whose implementation is illustrated in FIG. 5E. At PSK modulator 3 the code symbols phase modulate a 70 MHz carrier produced by a 70 MHz crystal oscillator 24 in a balanced mixer 25.

When the mode select switch S3 is set to 9.6 KB/S plus orderwire teletype mode of operation the multiplexer port counter and port timing decoder 16 operates at a 5 to 1 countdown. At the selected rates of 9.6, 4.8 and 2.4 KB/S the counter and decoder 16 has a division ratio of one. At these rates no multiplexing takes place and the input to coder 2 is at the same rate as the data input. When the mode selector switch S3 is set to orderwire teletype only mode, the counter and decoder 16 does a 2 to 1 division and distributes the timing signals only to sync generator 20 and teletype gate circuit 21. During this mode the converter 17 does not receive any input since no digital data from amplifier 19 is accepted during this mode of operation. Multiplexer 1 also provides two output clocks, one at 14.4 KB/S and the other at 3.2 KB/S derived from oscillator 8 and the baud rate source divider 26. At the output of divider 26 the 14.4 KB/S clock is applied to the baud rate divider 27 of teletype logic circuit 7 implemented as illustrated in FIG. 5BB and the 3.2 KB/S clock is applied to the teletype transmitting register with parity generator 28 whose implementation is illustrated in FIG. 5BB. The logic element 28 shown in FIG. 5BB performs the functions set forth in the block diagram.

The clock timing signals consist of a 1.2 KB/S sync timing signal and a 1.2 KB/S teletype timing signal which are generated by the counter and decoder 16 only during the orderwire teletype, 9.6 KB/S + orderwire teletype and the 48 KB/S + orderwire teletype modes of operation. During these modes of operation a 1.2 KB/S timing signal is applied to the sync generator 20 and the 1.2 KB/S teletype timing clock signal is fed to teletype gate circuit 21.

The teletype logic circuit 7 which is implemented as illustrated in FIG. 5BB is used in conjunction with multiplexer 1 and the transmitter portion of the digital PSK modem of this invention as follows. Interface the teletype low level input signal, allows selection of either low level or high level teletype signals, verify that each receive character contains a start and stop bit, convert the input baud rate to a 200 baud rate and provide a 1.2 KB/S teletype data output signal to multiplexer and retiming circuit 18 in conjunction with the 1.2 KB/S teletype timing signals received from multiplexer 1. The major logic components in FIG. 1B the transmitter portion of teletype logic circuit 7 are the MIL-STD-188C interface amplifier 29, the high level/low level select logic circuit 30, the teletype to modem receiver register with a start-stop logic check circuit 31, transmitting register with parity generator 28, teletype timing and sampling gate circuit 21 and baud rate divider 27. The integrated circuit logic modules 28 and 31 of FIG. 5BB, which are identified by the manufacturer as a universal asynchronous receiver/ transmitter, perform the functions set forth in FIG. 1B of the block diagram. The MIL-STD-188C amplifier receives low level teletype input signals from standard teletype using MIL-STD-188C signals (+6v and −6v) and converts these signals to TTL data levels. The TTL data output levels are then fed to select logic circuit 30 which is controlled by switch S5 whose schematic is shown in FIG. 4. Depending on the selection made by switch S5 the select logic circuit 30 will process either a low level teletype output signal from amplifier 29 or a high level teletype signal from the high level teletype interface 32 which is implemented as shown in FIG. 5CC. Once the selection has been made at logic circuit 30 the signal is routed to circuit 31. Here the serial signal input is assembled on a character by character basis and the start and stop bits generated by the teletype equipment are verified. Upon verification that a correct character has been received from the teletype equipment, circuit 31 transfers the characters to transmitting register with parity generator 28 where a new start bit, new stop bit and parity bit are added to the teletype character. After the three signals are added, the entire character is shifted serially from the transmitting register with parity generator 28 to the teletype timing and sampling gate circuit 21 at a rate of 200 bauds. Gate 21 in conjunction with the 1.2 KB/S teletype timing signal from the counter and decoder 16 samples the 200 baud input signal and provides a 1.2 KB/S teletype output signal to the multiplexer and retiming circuit 18 when it is included in the final output stream. The sampling of the 200 baud signals by the 1.2 KB/S teletype timing pulse means that six samples of each bit in the teletype character are actually included in the final output teletype stream. The multiple samples will be used at the receiving end for a forward error correction. The baud rate divider 27 in conjunction with the band rate switch S4 shown schematically in FIG. 3 generates a clock at 16 times the selected baud rate (45, 50, 75 or 150) and applies this clock to the circuit 31.

The receiver portion of the digital PSK modem of the present invention as shown in block diagram form in FIGS. 1C – 1F demodulates the PSK biphase signal and extracts timing, decodes the data and demultiplexes it into high speed data and teletype data via the operation of the PSK demodulator 33, a Costas' type phase locked loop, a clock recovery loop 3 4, Viterbi decoder 5, demultiplexer 6, teletype logic circuit 35 and teletype interface 84. A detailed explanation of the operation of each unit is provided hereinbelow.

PSK deomodulator 33 accepts a PSK 70 MHz input signal from interface equipment in the following manner. The PSK demodulator 33 is shown in block form in FIG. 1C and its schematic implementation is illustrated in FIG. 5F. A 70 MHz IF (intermediate frequency) input signal is applied to the input of buffer amplifier 36 via a PSK tracking level attenuator 37. The 70 MHz amplified output signal from buffer amplifier 36 is then applied to the input of a converter stage via a 70 MHz bandpass filter 38. The converter stage includes a balanced mixer 39 and a 64 MHz reference crystal oscillator 40. At the converter stage the 70 MHz signal is converted to a 6.0 MHz signal which is fed to the input of a buffer amplifier 41 via a 6.0 MHz bandpass filter 42. The amplified 6.0 MHz output signal from amplifier 41 is then applied to the input of a second converter stage including a balanced mixer 43 and a 4.992 MHz reference crystal oscillator 44. The output signal from the converter stage is a 1.008 MHz signal which is applied to a buffer amplifier 45, then to a 1.008 MHz bandpass filter 46 and hence to an IF amplifier 47. The 1.008 MHz output signal from amplifier 47 is then applied to a buffer amplifier 48 including transistors 49 and 50.

The amplified 1.008 MHz signal is then applied to an analog-to-digital converter 51 which is included as a portion of the logic diagram implementation in FIGS. 5G, 5H and 5I of a number controlled oscillator 52. An AGC (automatic gain control) loop including analog-to-digital converter 53, registers 54 and 55, decoders 56 and 57, AGC logic circuit 58 and digital-to-analog converter 59. This AGC loop acts to maintain a 0.63 Vrms (volts root mean square) signal level which is applied as an input to analog-to-digital converter 53. The digital output from converter 53 is strobed in registers 54 and 55 by the zero degrees phase and ninety degrees phase of a 1.008 MHz clock to form the in-phase and quadrature phase components of the input signals. The AGC voltage generated is applied to the AGC amplifier 60 and hence to the IF amplifier 47.

The operation of the Costas' type phase locked loop is to generate a reference carrier which is used to demodulate the 1.008 MHz signal. The Costas' type phase locked loop includes a digital phase shifter 61 illustrated in FIG. 1D and implemented as illustrated in FIGS. 5J, 5K, 5L and 5M, a carrier phase error accumulator 62 of FIG. 1D implemented as illustrated in FIG. 5P, loop filter 63 illustrated in FIG. 1D and implemented as illustrated in FIGS. 5T, 5U, 5V and 5W and a number controlled oscillator 52 shown in FIG. 1C and implemented as illustrated in FIGS. 5G, 5H and 5I.

The operation of the digital phase shifter 61 is to compare the phase of the input signal to that of a locally generated signal (sine and cosine signals generated by number controlled oscillator 52) and produce a data signal which is applied to the data signal accumulator 64 shown in FIG. 1D and implemented as illustrated in FIG. 5N and an error signal which is applied to carrier phase error accumulator 62 shown in FIG. 1D and implemented as illustrated in FIG. 5P. The signal in accumulator 64 is averaged over a data symbol period producing an eight-bit output signal. The eight-bit output signal from data symbol accumulator 64 is truncated to a three-bit soft decision via the soft decision circuit 65 shown in FIG. 1D and implemented as illustrated in FIG. 5R and applied to the input of the Viterbi decoder 5. The error signal of accumulator 62 is averaged over a data symbol period, filtered via loop filter 63 and applied to the number controlled oscillator 52 to correct any phase difference that may occur between the input signal and the locally generated signal. The search sequencer 66 shown in FIG. 1E as a portion of the demultiplexer 6 and implemented as illustrated in FIG. 5Z and 5AA initializes the frequency of the locally generated signal from number controlled oscillator 52 to within the lock-up range of the Costas' type phase locked loop by applying the initializing signal (FREQ. STEP) to loop filter 63.

Figure 1B:
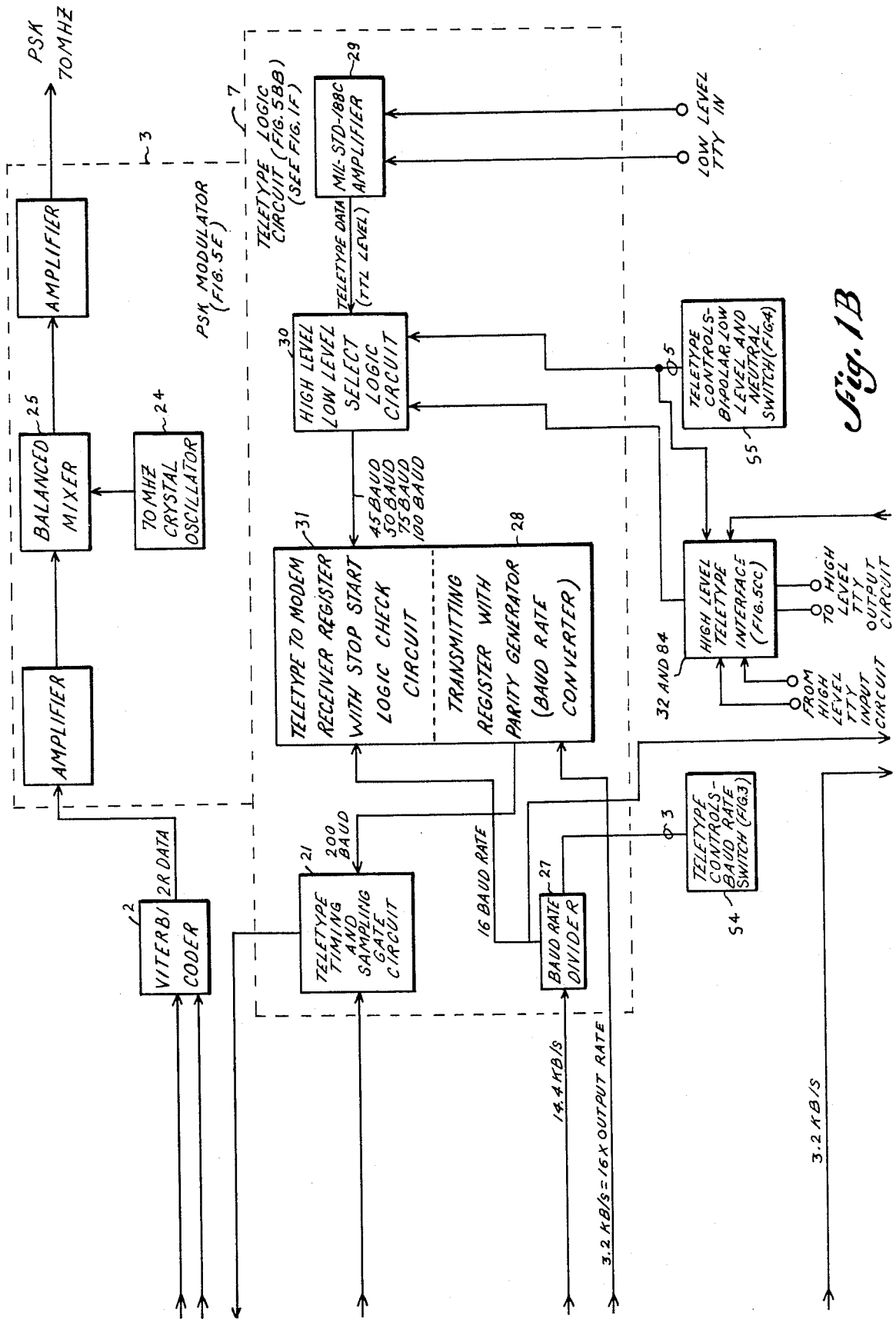
Figure 1C:
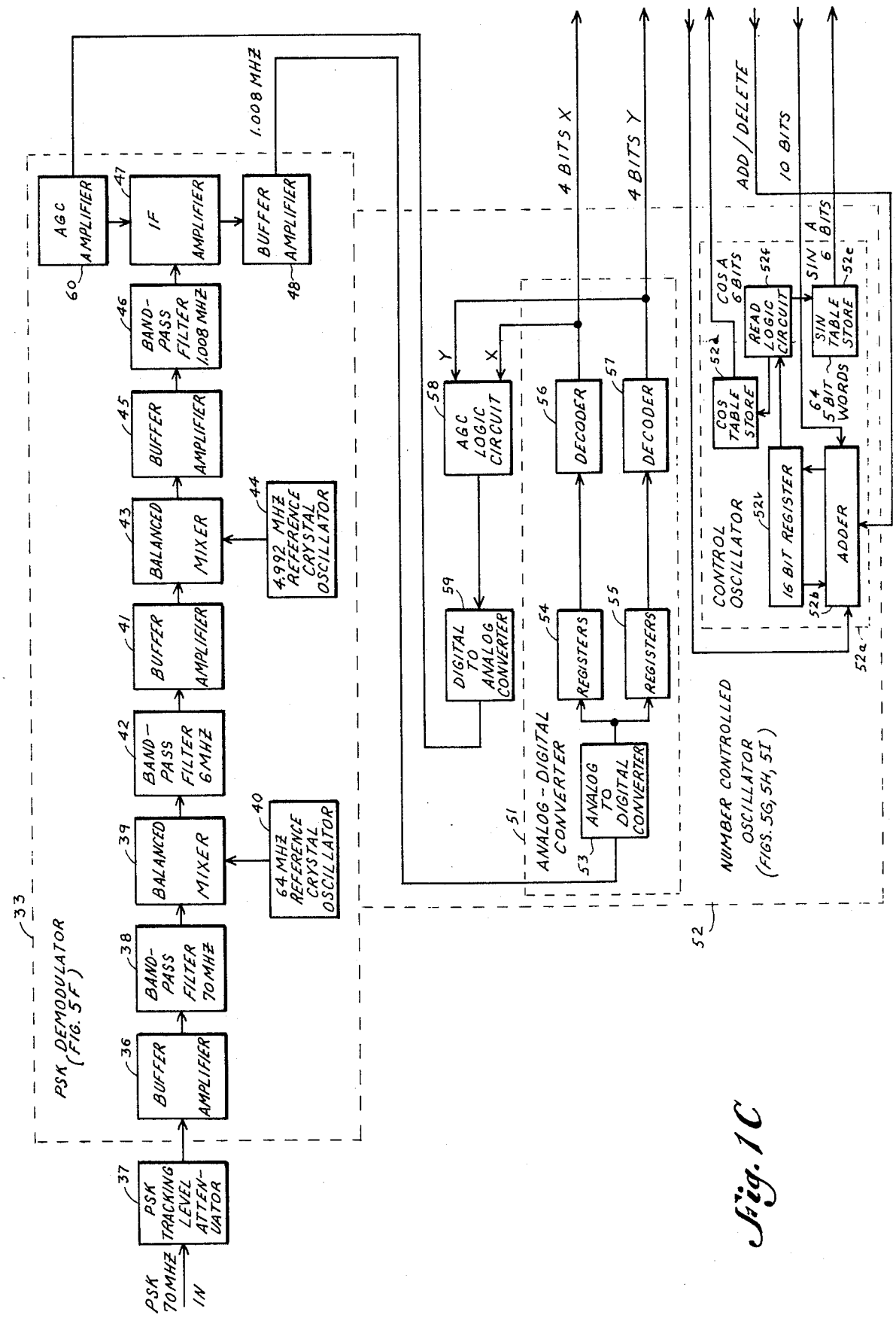

The number controlled oscillator 52 includes a control oscillator 52a shown in block diagram FIG. 1C which is implemented as illustrated in FIG. 5G, having an adder 52b, a 16-bit register 52c, a cosine table store 52d, a sine table store 52e and a read logic circuit 52f. Stores 52d and 52e provide the locally generated signal and the X and Y outputs of the decoders 56 and 57 provide the in-phase and quadrature component of the received 1.008 MHz digital data signal.

The digital phase shifter 61 shown in block diagram FIG. 1D which is implemented as illustrated in FIGS. 5J, 5K, 5L and 5M includes a sum of products circuit 61a coupled to decoders 56 and 57 and stores 52d and 52e, a difference of products circuit 61b coupled to decoders 56 and 57 and stores 52d and 52e, a gain factor multiplier circuit 61c coupled to circuit 61a to produce a 9-bit data signal and a gain factor multiplier circuit 61d coupled to circuit 61b to produce a 9-bit error signal.

The function of the clock recovery loop is to extract the timing from the data signals. The clock recovery loop includes a clock phase error accumulator 67 in block diagram of FIG. 1D which is implemented as illustrated in FIG. 5O, a data symbol accumulator 64 illustrated in block diagram FIG. 1D which is implemented as illustrated in FIG. 5N and clock recovery circuit 34 illustrated in FIG. 1D of the block diagram which is implemented as illustrated in FIGS. 5Q, 5R and 5S. The data output signal generated by the digital phase shifter 61 is applied to the data symbol accumulator 64. At accumulator 64 the data input signal is averaged over halves of adjacent sample period and produces an error signal which is used by the clock recovery circuit 34 to determine whether the clock rate is faster or slower than the data rate. The phase corrections are made to the clock by adding or deleting pulses from a higher rate clock via the add/delete logic circuit 68 shown in the block diagram of FIG. 1D which is implemented as illustrated in FIGS. 5Q and 5R. The basic clock rate generated by the clock recovery loop is 1.008 MHz, the input signal rate. The baseband data rates are derived by dividing down the recovered rate in divider chain 34a.

Demultiplexer 6 performs the following operations. Demultiplexes data, teletype and sync signals from the "R" rate data input signal from decoder 5, performs a frame alignment, smooths the output-data, provides traffic monitor capability and provides the MIL-STD-188C data interface output signal. The demultiplexer 6 employs the operation of the following logic circuits. A demultiplexer port counter and decoder 69, a teletype demultiplexer 70, a rate conversion elastic store 71 and a framing circuit 72. These circuits are illustrated in the block diagram of FIG. 1E and are implemented as illustrated in the logic diagrams 5X, 5Y, 5Z and 5AA.

The demultiplexer port counter and decoder 69 receives a "R" rate clock from Viterbi decoder 5. Depending on the selection made via the mode select switch S3 and the mode select logic circuit 73 the demultiplexer port counter and decoder 69 produces three clock signals. A 1.2 KB/S sync timing signal which is applied to framing circuit 72, a 1.2 KB/S teletype timing signal which is fed to the teletype demultiplexer 70 and a data timing signal which is fed to rate conversion elastic store 71. The teletype demultiplexer 70 is clocked by the 1.2 KB/S teletype timing signal, demultiplexes the teletype data and makes it available on the 1.2 KB/S teletype data conductor, which is then applied to the serial-to-parallel converter 74 shown in block diagram FIG. 1F which is implemented as illustrated in FIG. 5BB. The input circuitry of the rate conversion elastic store 71 receives the "R" data and the data timing signal which is used to store data other than teletype and sync signals.

The operation to accomplish frame alignment is as follows. At the time indicated by the demultiplexer port counter and decoder 69, frame circuit 72 looks at the bit in the "R" data stream and compares it to an internally generated signal to verify that a match or mismatch condition exists. The internally generated signal is produced by reference sync generator 72a. In the case of sufficient matched conditions, framing circuit 72 will indicate to the demultiplexer port conductor and decoder 69 that a sync bit exists and causes a counter 75 (FIG. 5X) to count up. In the case of excessive mismatches framing circuit 72 will indicate to the demultiplexer port count and decoder 69 that a sync bit does not exist and causes the port count and decoder 69 to pause via the HALT signal, causing the next bit in the data stream to be examined for sync bit location. In every two correct matches that are made, counter 75 is incremented by one and for each mismatch conditon counter 75 is decremented by one. After the mismatch conditions framing circuit 72 generates a HALT signal which is applied to port counter and decoder 69, causing this circuit to pause momentarily and slip by one bit. During this condition the frame circuit 72 looks at the next bit in the frame and checks to see that it is a true sync bit. Assuming that the error rate isn't high, framing circuit 72 should find one particular bit in the frame that indicates a correct sync bit.

Rate conversion elastic store 71 (FIG. 5X) smooths the data as follows. For 48 KB/S data + 2.4 KB/S orderwire which is composed of 1.2 KB/S sync and 1.2 KB/S teletype, each bit rate is transmitted at a bit rate of 50.4 KB/S signal. The "R" data looks as though it was transmitted at 50.4 KB/S. The function of the rate conversion elastic store 71 is to receive data and transmit it at the proper bit rate of 48 KB/S. This is done by loading the data into a store and reading it out from the same store a certain time later. The input and outputs are occurring at different times with different rates but the average input rate is equal to the output rate and this way any jitter in the input rate is smoothed out.

Traffic monitoring is accomplished by output traffic monitor 76 and operates by looking at the output data from the rate conversion elastic store 71 and checking the data for transitions from binary "0" to binary "1". A long string of zeros or ones does not have transitions in it for a length of time and will cause the output traffic monitor to indicate a lack of activity. The output traffic monitor 76 contains a resistance capacitance network 77 which provides a time constant long enough so that a string of zeros or ones that are normally found in the data stream are not at fault. At the lowest data rate of 2.4 KB/S the time constant is long enough where ten zeros or ones in a row do not trigger the alarm and indicate a fault condition. At a faster rate longer strings of zeros or ones are necessary before the alarm is triggered. The MIL-STD-188C interface capabilities are provided by the MIL-STD-188C driver 78 which includes a level shifting device which is driven by the input data from the data conversion elastic store 71. The data output signal provided by driver 78 is in accordance with the MIL-STD-188C relating to the levels of the binary "1" and binary "0" state and the rise and fall time of the digital data.

The operation of the teletype logic circuit 35 is as follows. It accepts a serial 1.2 KB/S teletype input signal from the demultiplexer 6, checks the bit by bit rate errors, converts the 1.2 KB/S rate to 200 baud, checks the start bit, stop bit and parity bit of each character, converts the required output baud rate of 45, 50, 75 and 150, allows selection of high level/low level output and provides the driver circuitry for low level output. The major circuits of the teletype logic circuit 35 shown in FIG. 1F which is implemented as illustrated in FIG. 5BB are the serial-to-parallel converter 74, a majority gate circuit 79, a receiving register with parity check logic circuit 80, a down converter modem to teletype transmit register with start/stop generator 81 and the MIL-STD-188C driver 82. The baud rate timing signal for circuit 81 is derived from baud rate divider 37 of the teletype logic circuit 7 and the teletype high level/low level circuit is nothing more than a wired connection between conductors 83 and 84 with the high level teletype signals on conductor 84 being conducted to the high level teletype interface 85 implemented as illustrated in FIG. 5CC. Serial-to-parallel converter 74 is used to accept the 1.2 KB/S teletype data serially according to timing provided by demultiplexer 6. The parallel output signal from converter 74 is coupled to a 2 of 3 majority gate 79 where each bit is repeated and the majority gate 79 is used to determine the most likely correct bit when errors have occurred. During this process the 1.2 KB/S signal is translated to 200 baud and routed to the receiving register with parity check logic circuit 80.

At the receiving register with parity check logic circuit 80 each character is assembled and a start bit, stop bit and parity bit which have been inserted at the transmitter end are checked for validity. The character is then transferred to teletype transmit register 81 where another start bit and stop bit are added and the output of register 81 is routed along conductor 83. When a low level interface is desired, the output of register 81 is routed to driver 82. At driver 82 the TTL data input is converted to low level teletype MIL-STD-188C signal and made available for interconnection to the teletype equipment. When high level teletype interface is desired, the output from register 81 is conducted along conductor 83 to conductor 84 and is routed to the teletype interface 85 (FI. 5CC) and made available for interconnection to the teletype equipment.

Figure 1E:
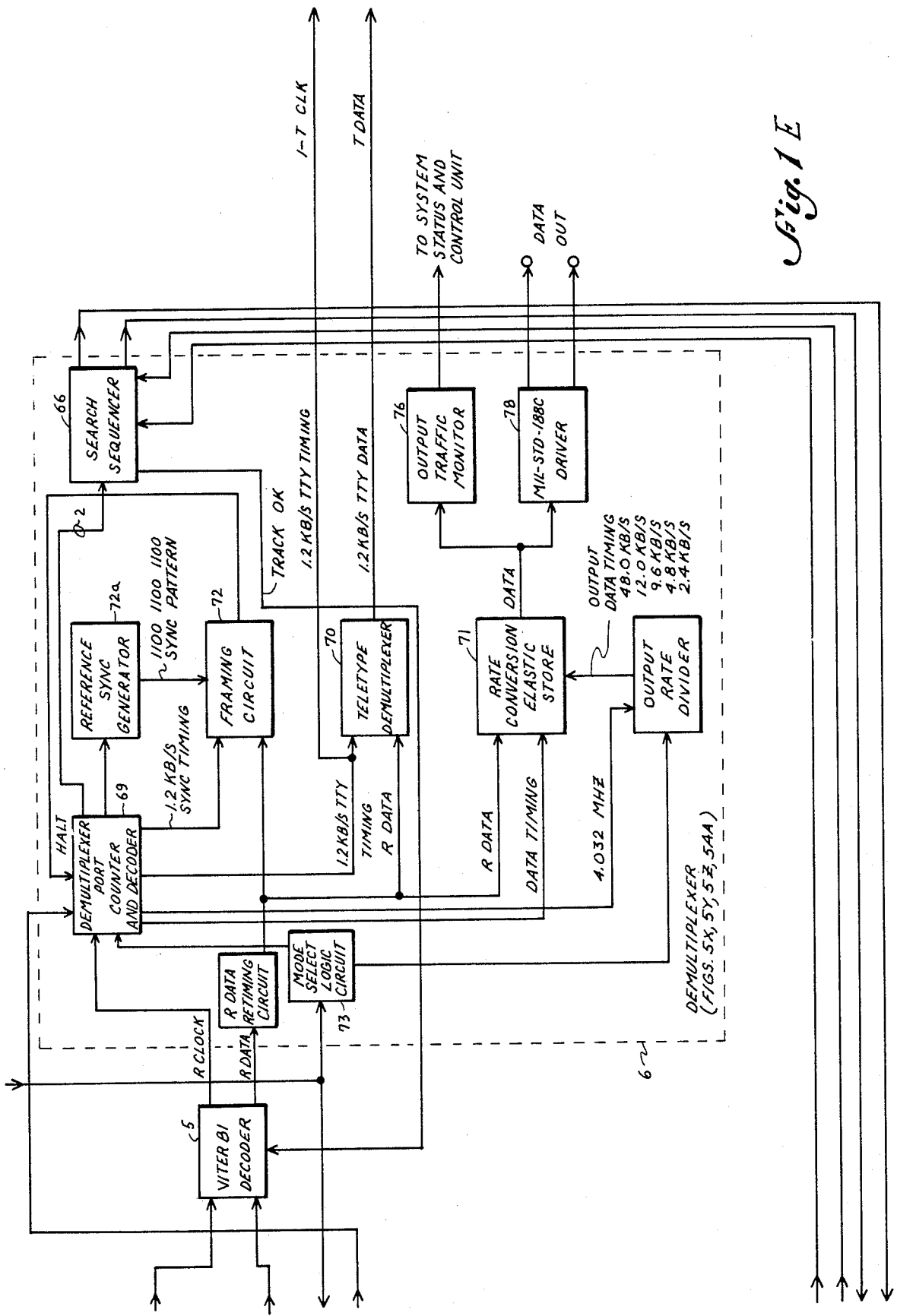

In FIGS. 5A – 5CC certain of the logic blocks have numbers therein without a letter prefix. These numbers are model numbers of the integrated circuits involved available from Texas Instruments, Fairchild and/or Signetics. Also the logic gate circuits and flip flops without numbers are available from these same manufacturers. The Viterbi coder and decoder of FIGS. 1B and 1E are available in a single module unit from Linkabit. The read only memories IM5610 of FIGS. 5G and 5S are available from Intersil. The digital-to-analog converter MN973 of FIG. 5I is available from Micronetworks. The universal asynchronous receiver/- transmitter TR1402A of FIG. 5BB are available from Western Digital. The Mercury Wetled Relay HGJM52112-T00 of FIG. 5CC is available from many different manufacurers. The balanced mixer of PSK modulator of FIG. 5E Model FC 200 is available from Lorch Electronics. The balanced mixers Model FC 200 of the PSK demodulator of FIG. 5F is available from Lorch Electronics. The MIL-STD-188c amplifiers and drivers are available from Texas Instruments, Fairchild and Signetics.

While we have described above the principles of our invention in connection with specific apparatus it is to be clearly understood that this description is made only by way of example and not as a limitation to the scope of our invention as set forth in the objects thereof and in the accompanying claims.

We claim:

1. A digital PSK (phase shift keyed) modem comprising:
  a transmitter portion including
    first means to multiplex first digital data and first teletype signals to provide first digital data signals;
    second means coupled to said first means to convert said first digital data signals into second digital data signals having a different digital form than said first digital data signals; and
    third means coupled to said second means responsive to said second digital data signals to provide a first PSK signal for transmission; and
  a receiver portion including
    fourth means to receive a second PSK signal containing third digital data signals having multiplexed second digital data and second teletype signals;
    fifth means coupled to said fourth means to extract said third digital data signals from said second PSK signal;
    sixth means coupled to said fifth means to convert said third digital data signals into fourth digital data signals having a different digital form than said third digital data signals; and
    seventh means coupled to said sixth means responsive to said fourth digital data signals to separate said second digital data and said second teletype signals for utilization;
  said first means including
    an eighth means to provide said first teletype signals having a selected baud rate and a selected amplitude,
    an elastic store rate converter coupled to an input for said first digital data,
    a multiplexer port counter and port timing decoder coupled to said converter to control the rate of said first digital data,
    a multiplexer port counter source divider coupled to said counter and port timing decoder to control the rate of operation thereof,
    a baud rate source divider coupled to said port counter source divider to control the rate of operation thereof;
    a phase locked loop having
      a voltage controlled oscillator coupled to said port counter source divider and said baud rate source divider,
      a phase, locked loop divider coupled to said voltage controlled oscillator, said baud rate source divider and said converter, a phase comparator coupled to said input and said phase locked loop divider to produce a control signal, and an analog phase locked loop filter coupled to said phase comparator and said voltage controlled oscillator to couple said control signal to said voltage controlled oscillator to adjust the frequency thereof;

a mode selector circuit coupled to said port counter source divider, said phase locked loop divider and said counter and port timing decoder to select the mode of operation of said transmitter portion;

a sync generator coupled to said counter and port timing decoder; and a multiplexer and retiming circuit coupled to said second means, said eighth means, said converter and said generator to provide said first digital data signals for coupling to said second means.

2. A modem according to claim 1, wherein said third means includes
a PSK modulator coupled to said second means.

3. A modem according to claim 1, wherein said second means includes
a Viterbi coder.

4. A modem according to claim 3, wherein said sixth means includes
a Viterbi decoder.

5. A modem according to claim 1, wherein said sixth means includes
a Viterbi decoder.

6. A modem according to claim 1, wherein said seventh means includes
a demultiplexer port counter and decoder coupled to said fifth means and said Viterbi decoder,
a reference sync generator coupled to said counter and decoder,
a framing circuit coupled to said Viterbi decoder, said counter and decoder and said reference sync generator,
a teletype demultiplexer coupled to said Viterbi decoder and said counter and decoder to extract said second teletype signals from said fourth digital data signals,
an output rate divider coupled to said counter and decoder,
a rate conversion elastic store coupled to said counter and decoder and said Viterbi decoder to extract said second digital data from said fourth digital data signals whose rate is controlled by said output rate divider,
a mode select logic circuit coupled to said counter and decoder and said output rate divider to select the mode of operation of said receiver portion,
a search sequencer coupled to said counter and decoder, said fifth means and said Viterbi decoder, and
eighth means coupled to said teletype demultiplexer to separate said second teletype signals according to selected baud rates and selected amplitudes.

7. A modem according to claim 1, wherein said fifth means includes
a PSK demodulator coupled to said fourth means,
a number controlled oscillator coupled to said PSK demodulator,
a digital phase shifter coupled to said number controlled oscillator,
an accumulator coupled to said digital phase shifter,
a clock recovery circuit coupled to said accmulator, said sixth means and said number controlled oscillator, and
a loop filter coupled to said accumulator, said seventh means, said clock recovery circuit and said number controlled oscillator.

8. A modem according to claim 7, wherein said number controlled oscillator includes
an analog-to-digital converter coupled to said PSK demodulator to produce two digital signals from a single output signal of said PSK demodulator,
a control oscillator producing sine and cosine signals, and
a digital-to-analog converter coupled to said analog-to-digital converter and said PSK demodulator, said digital-to-analog converter producing an automatic gain control signal for said PSK demodulator.

9. A modem according to claim 8, wherein said digital phase shifter includes
a sum of products circuit coupled to said analog-to-digital converter and said control oscillator responsive to said two digital signals and said sine and cosine signals to produce data bits of said third digital data signals, and
a difference of products circuit coupled to said analog-to-digital converter and said control oscillator responsive to said two digital signals and said sine and cosine signals to produce error bits of said third digital data signals.

10. A modem according to claim 9, wherein said accumulator includes
a data symbol accumulator coupled to said sum of products circuit,
a clock phase error accumulator coupled to said sum of products circuit, and
a carrier phase error accumulator coupled to said difference of products circuit.

11. A modem according to claim 10, wherein said clock recovery circuit includes
a stable oscillator,
a soft decision circuit coupled to said Viterbi decoder and said data symbol accumulator,
an add/delete logic circuit coupled to said stable oscillator, said soft decision circuit, said clock phase error accumulator and said control oscillator to add or delete pulses from the output signal thereof, and
a divider chain coupled to said add/delete logic circuit, said soft decision circuit and said Viterbi decoder.

12. A modem according to claim 11, wherein said loop filter is coupled to said seventh means, said data symbol accumulator and said carrier phase error accumulator to provide a control signal for said control oscillator.

13. A modem according to claim 12, wherein said seventh means includes
a demultiplexer port counter and decoder coupled to said add/delete logic circuit and said Viterbi decoder,
a reference sync generator coupled to said counter and decoder, a framing circuit coupled to said Viterbi decoder, said counter and decoder and said reference sync generator, a teletype demultiplexer coupled to said Viterbi decoder and said counter and decoder to extract said second teletype signals from said fourth digital data signals, an output rate divider coupled to said counter and decoder, a rate conversion elastic store coupled to said counter and decoder and said Viterbi decoder to extract said second digital data from said fourth digital data signals whose rate is controlled by said output rate divider, a mode select logic circuit coupled to said counter and decoder and said output rate divider to select the mode of operation of said receiver portion, a search sequencer coupled to said counter and decoder, said loop filter, said clock recovery circuit, said Viterbi decoder, said data symbol accumulator and said carrier phase error accmulator, and a ninth means coupled to said teletype demultiplexer to separate said second teletype signals according to selected baud rates and selected amplitudes.

14. A digital PSK (phase shift keyed) modem comprising:
a transmitter portion including
first means to multiplex first digital data and first teletype signals to provide first digital data signals;
second means coupled to said first means to convert said first digital data signals into second digital data signals having a different digital form than said first digital data signals; and
third means coupled to said second means responsive to said second digital data signals to provide a first PSK signal for transmission; and
a receiver portion including
fourth means to receive a second PSK signal containing third digital data signals having multiplexed second digital data and second teletype signals;
fifth means coupled to said fourth means to extract said third digital data signals from said second PSK signal;
sixth means coupled to said fifth means to convert said third digital data signals into fourth digital data signals having a different digital form than said third digital data signals; and
seventh means coupled to said sixth means responsive to said fourth digital data signals to separate said second digital data and said second teletype signals for utilization;
said fifth means including
a PSK demodulator coupled to said fourth means,
a number controlled oscillator coupled to said PSK demodulator,
a digital phase shifter coupled to said number controlled oscillator,
an accumulator coupled to said digital phase shifter,
a clock recovery circuit coupled to said accmulator, said sixth means and said number controlled oscillator, and a loop filter coupled to said accumulator, said seventh means, said clock recovery circuit and said number controlled oscillator.

15. A modem according to claim 14, wherein
said number controlled oscillator includes
an analog-to-digital converter coupled to said PSK demodulator, to produce two digital signals from a single output signal of said PSK demodulator,
a control oscillator producing sine and cosine signals, and
a digital-to-analog converter coupled to said analog-to-digital converter and said PSK demodulator, said digital-to-analog converter producing an automatic gain control signal for said PSK demodulator.

16. A modem according to claim 15, wherein
said digital phase shifter includes
a sum or products circuit coupled to said analog-to-digital converter and said control oscillator responsive to said two digital signals and said sine and cosine signals to produce data bits of said third digital data signals, and
a difference of products circuit coupled to said analog-to-digital converter and said control oscillator responsive to said two digital signals and said sine and cosine signals to produce error bits of said third digital data signals.

17. A modem according to claim 16, wherein
said accumulator includes
a data symbol accumulator coupled to said sum of products circuit,
a clock phase error accumulator coupled to said sum of products circuit, and
a carrier phase error accumulator coupled to said difference of products circuit.

18. A modem according to claim 17, wherein
said clock recovery circuit includes
a stable oscillator,
a soft decision circuit coupled to said sixth means and said data symbol accumulator,
and add/delete logic circuit coupled to said stable oscillator, said soft decision circuit, said clock phase error accumulator and said control oscillator to add or delete pulses from the output signal thereof, and
a divider chain coupled to said add/delete logic circuit, said soft decision circuit and said sixth means.

19. A modem according to claim 18, wherein
said loop filter is coupled to said seventh means, said data symbol accumulator and said carrier phase error accumulator to provide a control signal for said control oscillator.

20. A digital PSK (phase shift keyed) modem comprising:
a transmitter portion including
first means to multiplex first digital data and first teletype signals to provide first digital data signals;
second means coupled to said first means to convert said first digital data signals into second digital data signals having a different digital form than said first digital data signals; and
third means coupled to said second means responsive to said second digital data signals to provide a first PSK signal for transmission; and
a receiver portion including fourth means to receive a second PSK signal containing third digital data signals having multiplexed second digital data and second teletype signals;

fifth means coupled to said fourth means to extract said third digital data signals from said second PSK signal;

sixth means coupled to said fifth means to convert said third digital data signals into fourth digital data signals having a different digital form than said third digital data signals; and seventh means coupled to said sixth means responsive to said fourth digital data signals to separate said second digital data and said second teletype signals for utilization;

said seventh means including a demultiplexer port counter and decoder coupled to said fifth means and said sixth means, a reference sync generator coupled to said counter and decoder, a framing circuit coupled to said sixth means, said counter and decoder and said reference sync generator, a teletype demultiplexer coupled to said sixth means and said counter and decoder to extract said second teletype signals from said digital data signals, an output rate divider coupled to said counter and decoder, a rate conversion elastic store coupled to said counter and decoder and said sixth means to extract said second digital data from said digital data signals whose rate is controlled by said output rate divider, a mode select logic circuit coupled to said counter and decoder and said output rate divider to select the mode of operation of said receiver portion, a search sequencer coupled to said counter and decoder, said fifth means and said sixth means, and eighth means coupled to said teletype demultiplexer to separate said second teletype signals according to selected baud rates and selected amplitudes.

21. A digital PSK (phase shift keyed) modem comprising:

a transmitter portion including first means to multiplex first digital data and first teletype signals to provide first digital data signals;

second means coupled to said first means to convert said first digital data signals into second digital data signals having a different digital form than said first digital data signals; and third means coupled to said second means responsive to said second digital data signals to provide a first PSK signal for transmission; and a receiver portion including fourth means to receive a second PSK signal containing third digital data signals having multiplexed second digital data and second teletype signals;

fifth means coupled to said fourth means to extract said third digital data signals from said second PSK signal;

sixth means coupled to said fifth means to convert said third digital data signals into fourth digital data signals having a different digital form than said third digital data signals; and seventh means coupled to said sixth means responsive to said fourth digital data signals to separate said second digital data and said second teletype signals for utilization;

said second means including a Viterbi coder; and said first means including an eighth means to provide said first teletype signals having a selected baud rate and a selected amplitude, an elastic store rate converter coupled to an input for said first digital data, a multiplexer port counter and port timing decoder coupled to said converter to control the rate of said first digital data, a multiplexer port counter source divider coupled to said counter and port timing decoder to control the rate of operation thereof, a baud rate source divider coupled to said port counter source divider to control the rate of operation thereof;

a phase locked loop having a voltage controlled oscillator coupled to said port counter source divider and said baud rate source divider, a phase locked loop divider coupled to said voltage controlled oscillator, said baud rate source divider and said converter, a phase comparator coupled to said input and said phase locked loop divider to produce a control signal, and an analog phase locked loop coupled to said phase comparator and said voltage controlled oscillator to couple said control signal to said voltage controlled oscillator to adjust the frequency thereof;

a mode selector circuit coupled to said port counter source divider, said phase locked loop divider and said counter and port timing decoder to select the mode of operation of said transmitter portion;

a sync generator coupled to said counter and port timing decoder; and a multiplexer and retiming circuit coupled to said Viterbi coder, said eighth means, said converter and said generator to provide said first digital data signals for coupling to said Viterbi coder.

22. A modem according to claim 21, wherein
said third means includes
a PSK modulator coupled to said Viterbi coder.

23. A modem according to claim 22, wherein
said fifth means includes
a PSK demodulator coupled to said fourth means,
a number controlled oscillator coupled to said PSK demodulator,
a digital phase shifter coupled to said number controlled oscillator,
an accumulator coupled to said digital phase shifter,
a clock recovery circuit coupled to said accumulator, and sixth means and said number controlled oscillator, and
a loop filter coupled to said accumulator, said seventh means, said clock recovery circuit and said number controlled oscillator.

24. A modem according to claim 23, wherein said number controlled oscillator includes
  an analog-to-digital converter coupled to said PSK demodulator to produce two digital signals from a single output signal of said PSK demodulator,
  a control oscillator producing sine and cosine signals, and
  a digital-to-analog converter coupled to said analog-to-digital converter and said PSK demodulator, said digital to-analog converter producing an automatic gain control signal for said PSK demodulator.

25. A modem according to claim 24, wherein said digital phase shifter includes
  a sum of products circuit coupled to said analog-to-digital converter and said control oscillator responsive to said two digital signals and said sine and cosine signals to produce data bits of said third digital data signals, and
  a difference of products circuit coupled to said analog-to-digital converter and said control oscillator responsive to said two digital signals and said sine and cosine signals to produce error bits of said third digital data signals.

26. A modem according to claim 25, wherein said accumulator includes
  a data symbol accumulator coupled to said sum of products circuit,
  a clock phase error accumulator coupled to said sum of products circuit, and
  a carrier phase error accumulator coupled to said difference of products circuit.

27. A modem according to claim 26, wherein said clock recovery circuit includes
  a stable oscillator,
  a soft decision circuit coupled to said sixth means and said data symbol accumulator,
  an add/delete logic circuit coupled to said stable oscillator, said soft decision circuit, said clock phase error accumulator and said control oscillator to add or delete pulses from the output signal thereof, and
  a divider chain coupled to said add/delete logic circuit, said soft decision circuit and said sixth means.

28. A modem according to claim 27, wherein said loop filter is coupled to said seventh means, said data symbol accumulator and said carrier phase error accumulator to provide a control signal for said control oscillator.

29. A modem according to claim 28, wherein said seventh means includes
  a demultiplexer port counter and decoder coupled to said add/delete logic circuit and said sixth means,
  a reference sync generator coupled to said counter and decoder,
  a framing circuit coupled to said sixth means, said counter and decoder and said reference sync generator,
  a teletype demultiplexer coupled to said sixth means and said counter and decoder to extract said second teletype signals from said fourth digital data signals,
  an output rate divider coupled to said counter and decoder,
  a rate conversion elastic store coupled to said counter and decoder and said sixth means to extract said second digital data from said fourth digital data signals whose rate is controlled by said output rate divider,
  a mode select logic circuit coupled to said counter and decoder and said output rate divider to select the mode of operation of said receiver portion,
  a search sequencer coupled to said counter and decoder, said loop filter, said clock recovery circuit, said sixth means, said data symbol accumulator and said carrier phase error accumulator, and
  a ninth means coupled to said teletype demultiplexer to separate said second teletype signals according to selected baud rates and selected amplitudes.

30. A modem according to claim 29, wherein said sixth means includes
  a Viterbi decoder.

31. A transmitter portion for a digital PSK (phase shift keyed) modem comprising:
  first means to multiplex digital data and teletype signals to provide first digital data signals;
  second means coupled to said first means to convert said first digital data signals into second digital data signals having a different digital form than said first digital data signals; and
  third means coupled to said second means responsive to said second digital data signals to provide a PSK signal for transmission;
  said second means including
    A Viterbi coder; and said first means including
    an eighth means to provide said first teletype signals having a selected baud rate and a selected amplitude,
    an elastic store rate converter coupled to an input for said first digital data,
    a multiplexer port counter and port timing decoder coupled to said converter to control the rate of said first digital data,
    a multiplexer port counter source divider coupled to said counter and port timing decoder to control the rate of operation thereof,
    a baud rate source divider coupled to said port counter source divider to control the rate of operation thereof;
    a phase locked loop having
      a voltage controlled oscillator coupled to said port counter source divider and said baud rate source divider,
      a phase locked loop divider coupled to said voltage controlled oscillator, said baud rate source divider and said converter,
      a phase comparator coupled to said input and said phase locked loop divider to produce a control signal, and
      an analog phase locked loop coupled to said phase comparator and said voltage controlled oscillator to couple said control signal to said voltage controlled oscillator to adjust the frequency thereof;
    a mode selector circuit coupled to said port counter source divider, said phase locked loop divider and said counter and port timing decoder to select the mode of operation of said transmitter portion;
    a sync generator coupled to said counter and port timing decoder; and a multiplexer and retiming circuit coupled to said Viterbi coder said eighth means, said converter and said generator to provide said first digital data signals for coupling to said Viterbi coder.

32. A transmitter portion according to claim 31, wherein
said third means includes
a PSK modulator coupled to said Viterbi coder.

33. A transmitter portion according to claim 31, wherein
said third means includes
a PSK modulator coupled to said second means.

34. A receiver portion for a digital PSK (phase shift keyed) modem comprising:
first means to receive a PSK signal containing first digital data signals having multiplexed digital data and teletype signals;
second means coupled to said first means to extract said first digital data signals from said PSK signal;
third means coupled to said second means to convert said first digital data signal into second digital data signals having a different digital form than said first digital data signals, and
fourth means coupled to said third means responsive to said second digital data signals to separate said digital data and said teletype signals for utilization;
said third means including
a Viterbi decoder; and said second means including
a PSK demodulator coupled to said fourth means,
a number controlled oscillator coupled to said PSK demodulator,
a digital phase shifter coupled to said number controlled oscillator,
an accumulator coupled to said digital phase shifter,
a clock recovery circuit coupled to said accumulator, said sixth means and said number controlled oscillator, and
a loop filter coupled to said accumulator, said seventh means, said clock recovery circuit and said number controlled oscillator.

35. A receiver portion according to claim 34, wherein said fourth means includes
a demultiplexer port counter and decoder coupled to said second means and said Viterbi decoder,
a reference sync generator coupled to said counter and decoder,
a framing circuit coupled to said Viterbi decoder, said counter and decoder and said reference sync generator,
a teletype demultiplexer coupled to said Viterbi decoder and said counter and decoder to extract said teletype signals from said second digital data signals,
an output rate divider coupled to said counter and decoder,
a rate conversion elastic store coupled to said counter and decoder and said Viterbi decoder to extract said digital data from said second digital data signals whose rate is controlled by said output rate divider,
a mode select logic circuit coupled to said counter and decoder and said output rate divider to select the mode of operation of said receiver portion,
a search sequencer coupled to said counter and decoder, said second means and said Viterbi decoder, and
fifth means coupled to said teletype demultiplexer to separate said teletype signals according to selected baud rates and selected amplitudes.

36. A receiver portion according to claim 34, wherein said fourth means includes
a demultiplexer port counter and decoder coupled to said second means and said third means,
a reference sync generator coupled to said counter and decoder,
a framing circuit coupled to said third means, said counter and decoder and said reference sync generator,
a teletype demuliplexer coupled to said third means and said counter and decoder to extract said teletype signals from said second digital data signals,
an output rate divider coupled to said counter and decoder,
a rate conversion elastic store coupled to said counter and decoder and said third means to extract said digital data from said second digital data signals whose rate is controlled by said output rate divider,
a mode select logic circuit coupled to said counter and decoder and said output rate divider to select the mode of operation of said receiver portion,
a search sequencer coupled to said counter and decoder, said second means and said third means, and
fifth means coupled to said teletype demultiplexer to separate said teletype signals according to selected baud rates and selected amplitudes.

37. A receiver portion according to claim 34, wherein said second means includes
a PSK demodulator coupled to said fourth means,
a number controlled oscillator coupled to said PSK demodulator,
a digital phase shifter coupled to said number controlled oscillator,
an accumulator coupled to said digital phase shifter,
a clock recovery circuit coupled to said accumulator, and sixth means and said number controlled oscillator, and
a loop filter coupled to said accumulator, said seventh means, said clock recovery circuit and said number controlled oscillator.

38. A receiver portion according to claim 37, wherein said fourth means includes
a demultiplexer port counter and decoder coupled to said second means and said third means,
a reference sync generator coupled to said counter and decoder,
a framing circuit coupled to said third means, said counter and decoder and said reference sync generator,
a teletype demultiplexer coupled to said third means and said counter and decoder to extract said teletype signals from said second digital data signals,
an output rate divider coupled to said counter and decoder,
a rate conversion elastic store coupled to said counter and decoder and said third means to extract said digital data from said second digital data signals whose rate is controlled by said output rate divider, a mode select logic circuit coupled to said counter and decoder and said output rate divider to select the mode of operation of said receiver portion, a search sequencer coupled to said counter and decoder, said second means and said third means, and fifth means coupled to said teletype demultiplexer to separate said teletype signals according to selected baud rates and selected amplitudes;

39. A receiver portion according to claim 34, wherein said number controlled oscillator includes an analog-to-digital converter coupled to said PSK demodulator to produce two digital signals from a single output signal of said PSK demodulator, a control oscillator producing sine and cosine signals, and a digital-to-analog converter coupled to said analog-to-digital converter and said PSK demodulator, said digital-to-analog converter producing an automatic gain control signal for said PSK demodulator.

40. A receiver portion according to claim 39, wherein said digital phase shifter includes a sum of products circuit coupled to said analog-to-digital converter and said control oscillator responsive to said two digital signals and said sine and cosine signals to produce data bits of said first digital data signals, and a difference of products circuit coupled to said analog-to-digital converter and said control oscillator responsive to said two digital signals and said sine and cosine signals to produce error bits of said first digital data signals.

41. A receiver portion according to claim 40, wherein said accumulator includes a data symbol accumulator coupled to said sum of products circuit, a clock phase error accumulator coupled to said sum of products circuit, and a carrier phase error accumulator coupled to said difference of products circuit.

42. A receiver portion according to claim 41, wherein said clock recovery circuit includes a stable oscillator, a soft decision circuit coupled to said third means and said data symbol accumulator, an add/delete logic circuit coupled to said stable oscillator, said soft decision circuit, said clock phase error accumulator and said control oscillator to add or delete pulses from the output signal thereof, and a divider chain coupled to said add/delete logic circuit, said soft decision circuit and said third means.

43. A receiver portion according to claim 42, wherein said loop filter is coupled to said fourth means, said data symbol accumulator and said carrier phase error accumulator to provide a control signal for said control oscillator.

44. A receiver portion according to claim 43, wherein said fourth means includes a demultiplexer port counter and divider coupled to said add/delete logic circuit and said Viterbi decoder, a reference sync generator coupled to said counter and decoder, a framing circuit coupled to said Viterbi decoder, said counter and decoder and said reference sync generator, a teletype demultiplexer coupled to said Viterbi decoder and said counter and decoder to extract said teletype signal from said second digital data signals, an output rate divider coupled to said counter and decoder, a rate conversion elastic store coupled to said counter and decoder and said Viterbi decoder to extract said digital from said second digital data signals whose rate is controlled by said output rate divider, a mode select logic circuit coupled to said counter and decoder and said output rate divider to select the mode of operation of said receiver portion, a search sequencer coupled to said counter and decoder, said loop filter, said clock recovery circuit, said Viterbi decoder, said data symbol accumulator and said carrier phase error accumulator, and fifth means coupled to said teletype demultiplexer to separate said teletype signals according to selected baud rates and selected amplitudes.

* * * * *